United States Patent [19]

Pavliscak

[11] 4,320,418

[45] Mar. 16, 1982

[54] LARGE AREA DISPLAY

[76] Inventor: Thomas J. Pavliscak, 2 S 454 Seneca Dr., Wheaton, Ill. 60187

[21] Appl. No.: 149,415

[22] Filed: May 13, 1980

Related U.S. Application Data

[63] Continuation-in-part of Ser. No. 967,740, Dec. 8, 1978, Pat. No. 4,233,623, which is a continuation-in-part of Ser. No. 788,517, Apr. 18, 1977, abandoned.

[51] Int. Cl.³ .......................... H04N 3/00; H04N 5/66
[52] U.S. Cl. ..................................... 358/240; 313/217; 315/169.4; 340/771; 340/811; 340/758
[58] Field of Search ................ 358/240; 340/771, 772, 340/773, 811, 812, 758; 315/169.4; 313/217

[56] References Cited

PUBLICATIONS

IBM Technical Note, vol. 12, No. 11, p. 1956, Apr. 1970.

*Primary Examiner*—Robert L. Richardson

[57] ABSTRACT

A display device is described with a large active viewing area having a high resolution electrode matrix of light emitting cells or pixels. The electrode matrix area is divided into at least two distinct sections by dividing each electrode along at least one axis into at least two separated electrode lengths, each length containing only a portion of the total number of light emitting pixels contained by the total unseparated length of the electrode. In the preferred practice, the electrode matrix area is divided into at least four distinct sections so as to divide each electrode along each axis into at least two lengths. Thus, the electrode matrix area is divided into at least two, preferably at least four, distinct sections of light emitting cells or pixels. Each area of the matrix can be electrically driven by the same or different electrical circuits. Each separated electrode length has decreased electrical resistance, decreased electrical capacitance and requires less electrical current. This results in the more uniform operation of each cell or pixel relative to other cells along each electrode length, particularly less variations in the operating conditions and performance of each cell relative to other cells such as more uniform operating voltages, light emission, and brightness. The device may be used as a computer terminal, especially in a military tactical situation, with or without television or video application.

5 Claims, 12 Drawing Figures

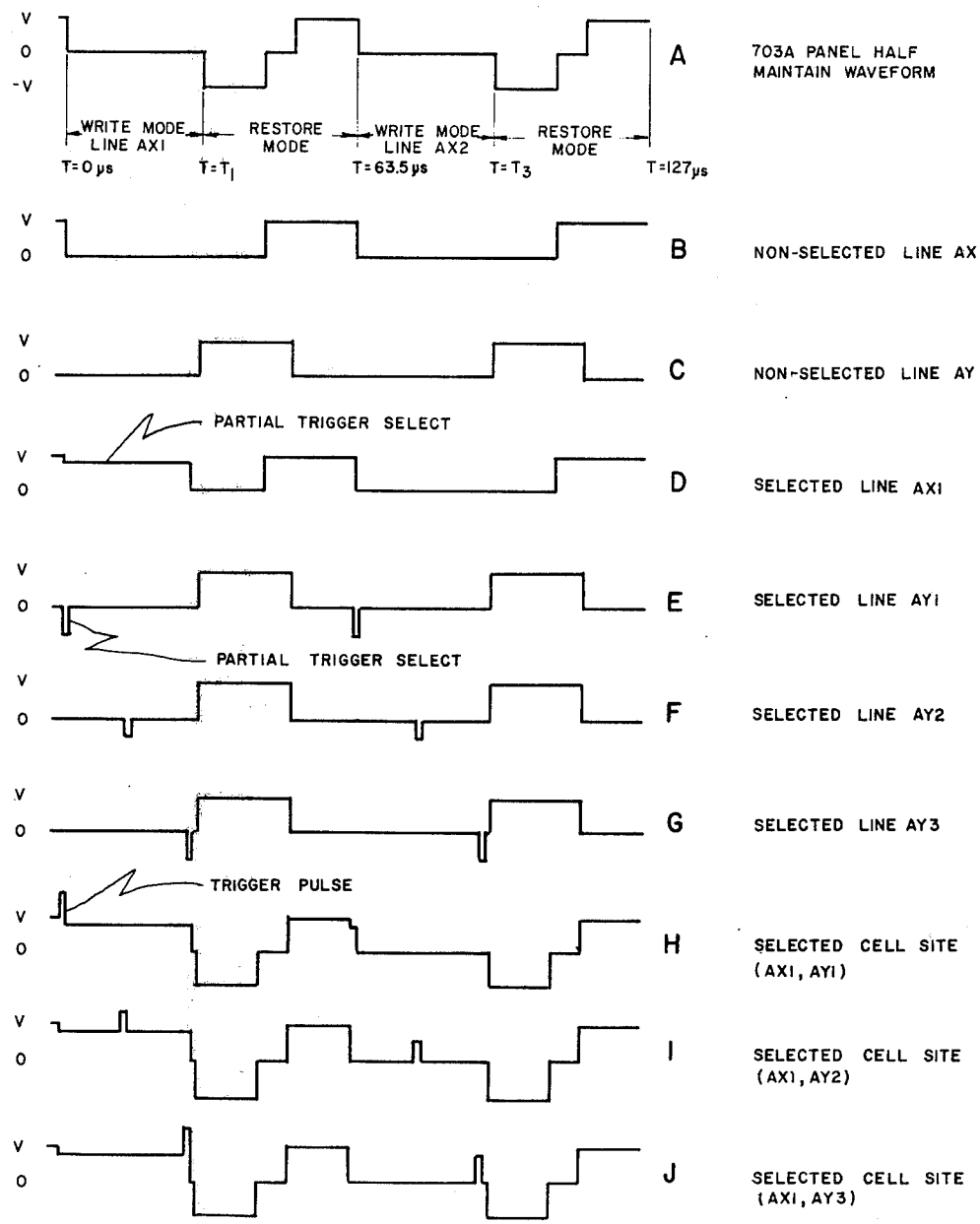
FIGURE 6 (A-J)

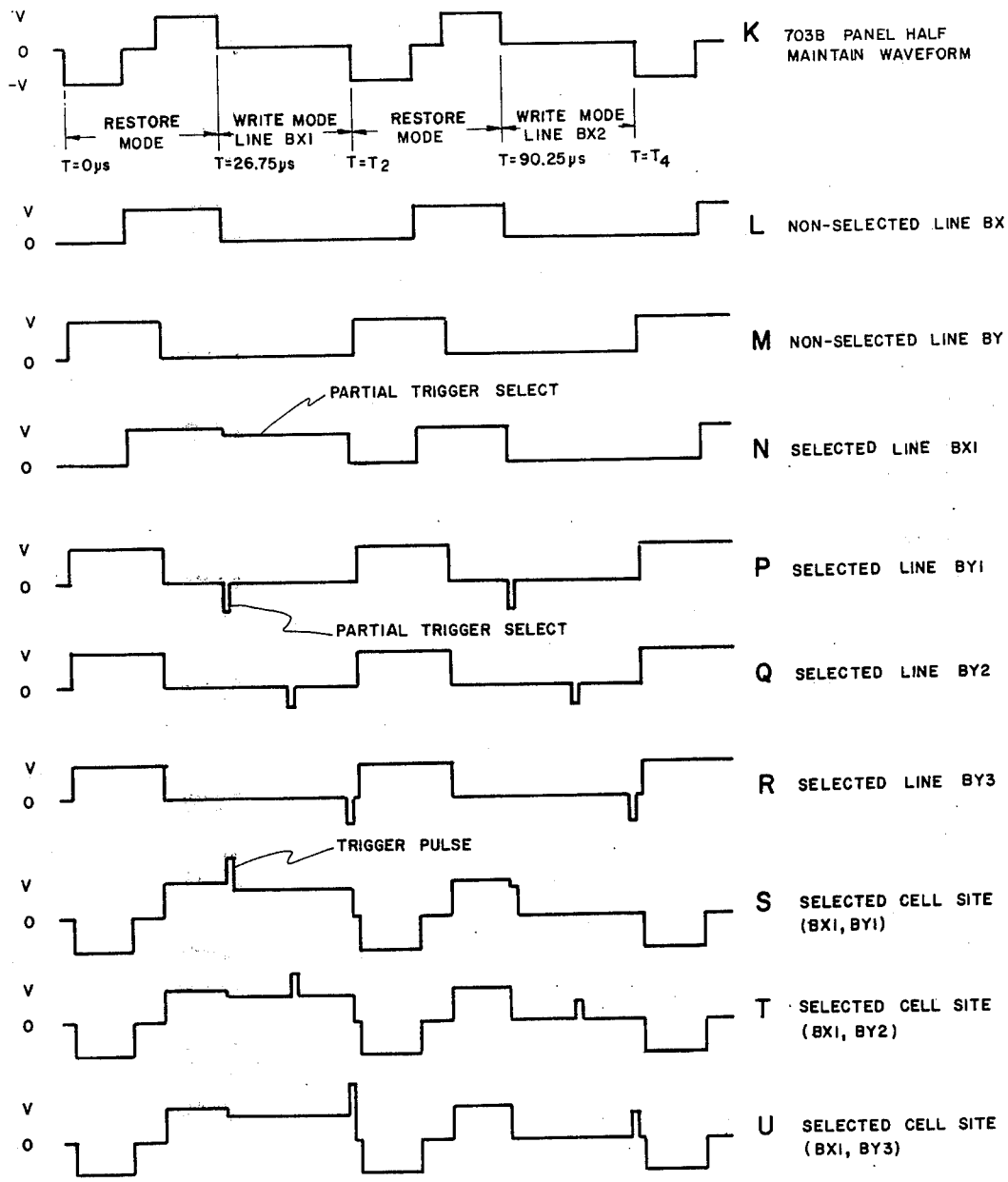
FIGURE 6 (K-U)

LARGE AREA DISPLAY

RELATED APPLICATIONS

This is a continuation in part of my copending U.S. patent application Ser. No. 967,740, filed Dec. 8, 1978, and now U.S. Pat. No. 4,233,623 which is a continuation in part of my previously copending U.S. patent application Ser. No. 788,517, filed Apr. 18, 1977, now abandoned. The benefits of these earlier filed patent applications are claimed in accordance with the provisions of 35 U. S. C. 120.

BACKGROUND OF THE INVENTION

This invention relates to the design and fabrication of large area gaseous discharge (plasma) display panels.

Multiple cell gas discharge display and/or memory panels of one particular type with which the present invention is concerned are characterized by an ionizable gaseous medium, at an appropriate gas pressure, in a thin gas chamber or space between a pair of opposed dielectric charge storage members. The dielectric charge storage members are typically backed by arrays of electrodes or conductors which are appropriately oriented so as to define a plurality of discrete gas discharge unit or cell sites.

In some prior art panels, the discharge cells are additionally defined by surrounding or confining physical structure such as apertures in perforated glass plates and the like so as to be physically isolated relative to other cells.

In either case, with or without the confining physical structure, electronic charges (electrons and ions) produced upon ionization of the gas volume at a selected discharge cell, when proper alternating operating potentials are applied to selected electrodes or conductors thereof, are collected upon and/or within the dielectric at specific locations defined by the crossovers of opposite electrodes. These charges constitute an electrical field opposing the electrical field which created them so as to terminate the gas discharge for the remainder of the half cycle and aid in the initiation of a gas discharge on a succeeding opposite half cycle of applied voltage. Such dielectric charges as are stored constitute an electrical memory.

Thus, the dielectric layers prevent the passage of substantial conductive current from the conductor members to the gaseous medium and also serve as collecting surfaces for ionized gaseous medium charges (electrons and ions) during the alternate half cycles of the A.C. operating potentials. Such charges collect first at one elemental or discrete dielectric surface area and then at an opposing elemental or discrete dielectric surface area on alternate half cycles to constitute the electrical memory.

An example of a panel structure containing non-physically isolated or open discharge cells is disclosed in U.S. Pat. No. 3,499,167 (incorporated herein by reference) issued to Theodore C. Baker, et al.

An example of a panel containing physically isolated cells is disclosed in the article by D. L. Bitzer and H. G. Slottow entitled "The Plasma Display Panel-A Digitally Addressable Display With Inherent Memory." Proceeding of the Fall Joint Computer Conference, IEEE, San Francisco, Calif., November, 1966, pages 541-547 and also in U.S. Pat. No. 3,559,190 (incorporated herein by reference) issued to D. L. Bitzer et al.

A monolithic or single substrate device structure may also be used as disclosed in U.S. Pat. Nos. 3,860,846 (Mayer) and 3,896,327 (Schermerhorn), both incorporated herein by reference.

In the construction of the panel, a continuous volume of ionizable gas is confined between a pair of dielectric surfaces backed by electrode arrays typically forming matrix elements. The two electrode arrays may be orthogonally related sets of parallel lines (but any other configuration of electrode arrays may be used). The two arrays of electrodes define at their crossovers a plurality of opposed pairs of charge storage areas on the opposing surfaces of the dielectric members bounding or confining the gas. Thus, for a first array of R parallel row electrodes and a second array of C parallel column electrodes, the number of gas discharge cells will be the multiple of R times C and the number of dielectric charge storage locations will be twice the number of discharge cells.

The state of the art explanation as to the charge storage mechanism of the A.C. gas discharge memory panel appears in the U.S. Pat. No. 3,559,190 (Bitzer, et al.) and U.S. Pat. No. 3,499,167 (Baker, et al.), both of which patents are incorporated by reference into the present disclosure. The prior art typically explains the memory mechanism in terms of the storage or accumulation of wall charges on a dielectric surface. However, this is a theoretical physics mechanism, and it is not known for certain whether the wall charges (constituting the so-called memory) are stored on the surface of the dielectric member or beneath the dielectric. Perhaps, it is some combination of the two mechanisms with the wall charges being stored both on and beneath the dielectric surface. In any case, the present invention is not dependent upon any particular theoretical explanation as to how the charges are retained and stored by the dielectric. The important fact is that wall charges are in some way retained and stored by a dielectric member in an A.C. gas discharge device; i.e., of the types and structures disclosed by the U.S. patents issued to Bitzer, et al., Baker, et al., Mayer, and Schermerhorn incorporated by reference into the present disclosure.

SUMMARY OF THE INVENTION

This invention relates to the design and manufacture of large area and high resolution electrode matrix display devices, especially large area flat gas discharge (plasma) panels.

Heretofore, the physical area of matrix display panels has been greatly restricted by limitations on the overall length of each electrode in the matrix. The relatively long electrode lengths, required in the fabrication of large area display devices, results in proportional increase in the overall electrical resistance of each electrode line.

In a high resolution gas discharge (plasma) display, there are multiple gas discharge cell sites or pixels along each electrode line. In an A.C. (alternating current) display device, each cell site acts as a mini capacitor with resulting current flow during operation. The cumulative effect in a high resolution device is both increased electrical capacitance and higher electrical current required per electrode.

In the operation of an A.C. gas discharge display device designed for both large area and high resolution, there will be increased electrical resistance caused by the longer length electrode lines (required by the larger area) and increased electrical capacitance and current flow caused by the multiple cell sites (required by the higher resolutions). The overall cumulative effects are undesirable variations in the electrical operation and performance of each cell site relative to other cell sites along a particular electrode line. Such variations in the operation of the cells along each electrode line include non-uniform operating voltages and non-uniform cell light output and brightness (where the cell is being used as a light emitting pixel).

In one embodiment of this invention, there is provided an A.C. gas discharge (plasma) display device with a large active viewing area containing an electrode matrix of light emitting cells or pixels. In a further embodiment of this invention, the plasma panel is a so-called high resolution device containing a high density of cells or pixels within the viewing area.

In accordance with the practice of this invention, the electrode matrix area is divided into at least two distinct sections by the division and separation of the electrodes along at least one axis into at least two separated electrode lengths, each separated length containing only a portion of the total number of pixels or cells contained by the total unseparated length of the electrode.

In the perferred practice, the electrode matrix area is divided into at least four distinct sections so as to divide each electrode along each axis into at least two separated electrode lengths.

Thus the electrode matrix area is divided into at least two, preferably at least four, distinct sections of cells or pixels.

Each distinct section of the matrix area can be electrically driven by the same or different electrical circuitry.

Each separated electrode length has decreased electrical resistance, decreased electrical capacitance and requires less electrical current. This results in the more uniform operation of each cell or pixel relative to other cells along each electrode length, particularly less variations in the operating conditions and performance of each cell relative to other cells such as more uniform operating voltages, light emission, and brightness.

In any A.C. plasma display panel, it is difficult to control the overall panel gap. Panel gap is defined as the distance between the opposing dielectric surfaces. The larger the panel, the more difficult it is to control panel gap. Thus, panel gap from cell to cell tends to be less uniform in large area matrix display panels. For example, in a large area display, the overall average gap is one panel quadrant tends to be greater or lesser relative to the overall average gap in another panel quadrant.

The practice of this invention is preferred in large area display devices having a display area of at least 2500 square centimeters or where the electrodes in the physically and electrically divided arrays are at least 50 centimeters long.

GRAY SCALE OR MULTIPLE INTENSITY

The use of an A.C. gas discharge memory panel as a televison device depends upon so-called gray scale or multiple intensity operation. A number of techniques have been disclosed in the prior art for gray scale operation of a gas discharge device. For example, these include spatial gray scale as disclosed in U.S. Pat. No. 3,845,243 issued to Schmersal et al.; time modulation of bistable states as disclosed in U.S. Pat. No. 3,863,023 also issued to Schmersal et al.; ordered dither; and geometric arrangements such as stacked panels. These prior art gray scale methods generally depend upon the operation of the A.C. gas discharge device in the bistable memory mode. As will be discussed in detail hereinafter, the present invention is directed to the gray scale operation of an A.C. plasma panel in a non-memory or non-bistable mode as disclosed in Nolan U.S. Pat. No. 4,002,828 incorporated by reference into the present disclosure.

In the practice of the present invention, there is used a gray scale technique which depends upon the generation of unstable sequences of gas discharge pulses as generally disclosed by Nolan U.S. Pat. No. 4,002,828, which is incorporated by reference into the present disclosure. This gray scale method comprises addressing a cell site with a trigger write voltage pulse to initiate a gas discharge and then applying to the cell site a maintain voltage pulse with a magnitude less than the lower limit of the bistable memory region such that the initiated gas discharge gradually dies out or fades away.

Thus the gray scale technique of this invention utilizes unstable sequences of discharge pulses which gradually die out. If an alternating maintain voltage is applied to the opposed electrodes defining a discharge cell, wherein said voltage has a magnitude somewhat less than the lower limit of the bistable region in which gas discharge display panels are normally operated, the cell cannot be turned "on" in the normal sense of initiating a sequence of discharges which continues indefinitely. However, the cell can be turned "on" by a trigger voltage to initiate an unstable sequence of discharges which continues for a substantial number of cycles before dying out. The number of cycles is a function of the magnitude of the trigger voltage, all other things being constant. An entire panel can be operated in this manner to generate a gray scale display.

A television picture video analog signal represents video information obtained by horizontally scanning line by line. In Nolan U.S. Pat. No. 4,002,828 a portion of the video signal representing one line is sampled and stored at intervals according to the number of vertical axis electrodes in a gas discharge panel. This information is written along one horizontal axis panel line during the time the video signal is blanked between lines. The stored signals have magnitudes proportional to the magnitudes of the video signal and are applied to the vertical axis electrodes as a first portion of the trigger voltages while a second portion is applied to a horizontal axis electrode to generate one horizontal line which is a replica of the corresponding lines of the television picture. Each successive horizontal line is generated in a similar manner and interlacing is used to reduce flicker.

The present invention represents an improvement over Nolan U.S. Pat. No. 4,002,828 in that there is no intermediate storage of the television signal. In accordance with the practice of this invention, the plasma panel is divided into at least two distinct geometric or physical sections with a different maintain voltage pulse being applied to each distinct section such that the panel can be addressed in real time without storing of the incoming television signal.

More particularly, in accordance with this invention, the electrodes of at least one array are physically interrupted along one axis so as to divide the panel into at least two distinct sections of gas discharge cells with a different maintain voltage pulse waveform being applied to each distinct panel section, the magnitude of each maintain voltage pulse being insufficient to initiate a gas discharge at a cell site and also insufficient to sustain a sequence of gas discharges at a cell site of relatively constant intensity for an indefinite length of time. However, the magnitude of each maintain voltage pulse is sufficient to continue or support a sequence of diminishing gas discharges having been initiated by a trigger voltage pulse representing the incoming television information. The different maintain voltage wave forms applied to each panel section are synchronized such that a trigger pulse can be applied to one panel section during the write cycle of the maintain voltage applied to that section while the maintain voltage applied to another section is being restored to the write cycle. In this way, each distinct panel section is addressed with trigger voltage pulses in real time response to a television video signal. There is no sample and hold of the signals. The electronics for practicing this invention are described and illustrated hereinafter.

As already noted, a primary advantage of this invention is the addressing of the panel (and its sections) in real time. In the prior art device of Nolan U.S. Pat. No. 4,002,828, it is necessary to sample and hold the incoming transmitted television signal. Each row of electrodes is then simultaneously addressed with all of the previously sampled and held signals. A discussion of this technique, including the necessary sample and hold electronics, is disclosed in U.S. Pat. No. 4,067,047 issued to Ryan.

In one particular variation of the present invention, the Nolan/Ryan sample and hold technique may be applied to each panel section. In this embodiment, a portion 1/N of the transmitted signals is stored, such portion being determined by the number N of panel sections. Thus, one-half ($\frac{1}{2}$) of the signal is stored if there are two sections, one-third ($\frac{1}{3}$) is stored if there are three sections, and so forth. The advantage of this variation is that each signal is held for a smaller interval of time and real time addressing is more nearly approached.

However, in the preferred practice of this invention as discussed and detailed hereafter, a sample and hold technique is not used. Instead, each panel section (and the entire panel) is addressed in real time without sample and hold.

BRIEF DESCRIPTION OF THE DRAWINGS

The drawings are presented to illustrate the best mode contemplated by me in the practice of my invention.

FIGS. 6A through 6U illustrate the waveforms for various maintain and trigger pulses including the half select components thereof.

DETAILED DESCRIPTION OF THE DRAWINGS AND THE INVENTION

Figure 1:
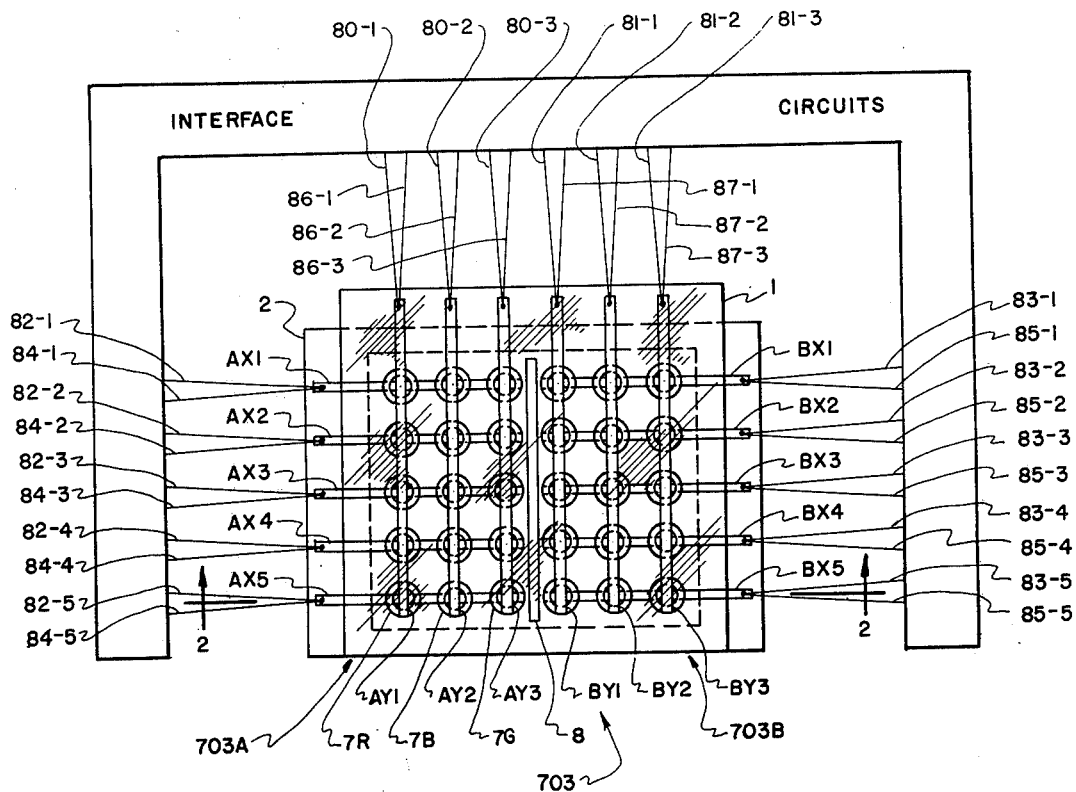
FIG. 1 is a plan or top view of an open cell, parallel substrates, gas discharge television display panel.
Figure 2:
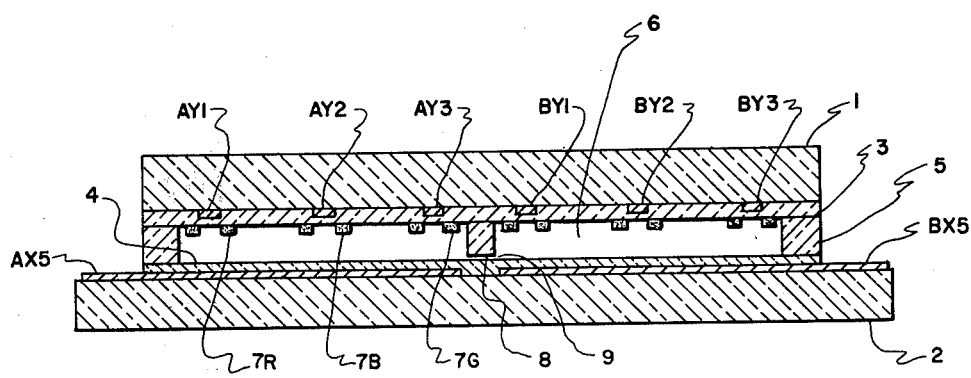
FIG. 2 is a cross-section of FIG. 1.

FIGS. 1 and 2 illustrate one gas discharge television display structure for panel 703. This panel embodiment, known as the parallel plates structure, is of the general geometric design and configuration disclosed by Bitzer et al. U.S. Pat. No. 3,559,190 and Baker et al. U.S. Pat. No. 3,499,167, both of which patents are incorporated herein by reference.

In FIGS. 1 and 2 there is illustrated a panel device 703 (with distinct panel halves 703A and 703B) comprising spaced-apart parallel substrates or plates 1 and 2. Substrate 1 contains an array of Y-electrodes AY1, AY2, AY3, etc. in panel half 703A with two series of leads 80-1, 80-2, etc. and 86-1, 86-2, etc. Substrate 1 further contains an array of Y-electrodes BY1, BY2, BY3, etc. in panel half 703B with two series of leads 81-1, 81-2, etc. and 87-1, 87-2, etc. Substrate 2 contains a first distinct array of X-electrodes AX1, AX2, AX3, etc. in panel half 703A with two series of leads 82-1, 82-2, etc. and 84-1, 84-2, etc. Substrate 2 also contains a second distinct array of X-electrodes BX1, BX2, BX3, etc. in panel half 703B with two series of leads 83-1, 83-2, etc. and 85-1, 85-2, etc. The two distinct arrays of X-electrodes are formed by physically discontinuing and separating each X-electrode at or about a center axis of panel 703.

The Y-electrodes are covered with a dielectric material member 3 and the X-electrodes are covered with a dielectric material member 4. The substrates 1 and 2 are sealed together around the edge with sealing member 5, such that the face of dielectric 3 is opposite the face of dielectric 4. The sealed together substrates are spaced apart to form a chamber 6. The seal 5 also serves as a spacer to maintain the substrates in a uniformly spaced apart relationship. In large size panels, it is often necessary to provide spacers inside of the chamber 6. The chamber 6 is filled with an ionizable gaseous medium. The gaseous medium may be introduced into the chamber via tubulation (not shown) or by sealing the substrates together in a chamber filled with the gaseous medium.

As illustrated in FIGS. 1 and 2 the arrays of Y-electrodes and X-electrodes form a matrix of cross-overs of X-Y electrodes. Each X-Y cross-over defines a gas discharge cell site. For example, the cross-over of electrode line AX1 and the cross-over of electrode line AY1 defines one cell site in panel half 703A.

A phosphor material 7 is deposited on the gas contacting surface of dielectric 3 in the geometric configuration of a round or square donut about each gas discharge cell site. The phosphor 7 is arranged along each X-axis such that there is a phosphor triad comprising a repetitive sequence of three consecutive red, blue, and green light emitting phosphors, (7R, 7B, 7G).

The panel halves 703A and 703B may be partially separated by a guard or barrier member 8 to mitigate electrical cross-talk. In order to have pressure equalization in each panel half, there should be at least one opening or connecting gas passage 9 in the barrier 8.

Figure 3:
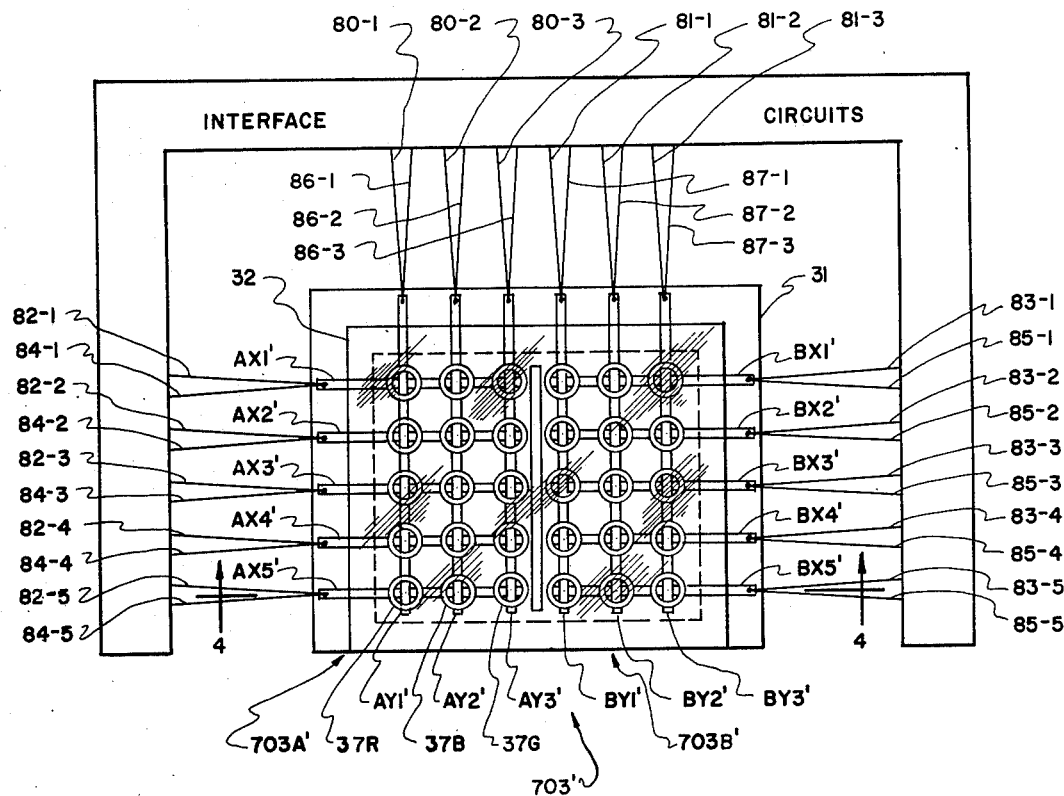
FIG. 3 is a plan or top view of a planar or monolithic substrate gas discharge television display panel.
Figure 4:
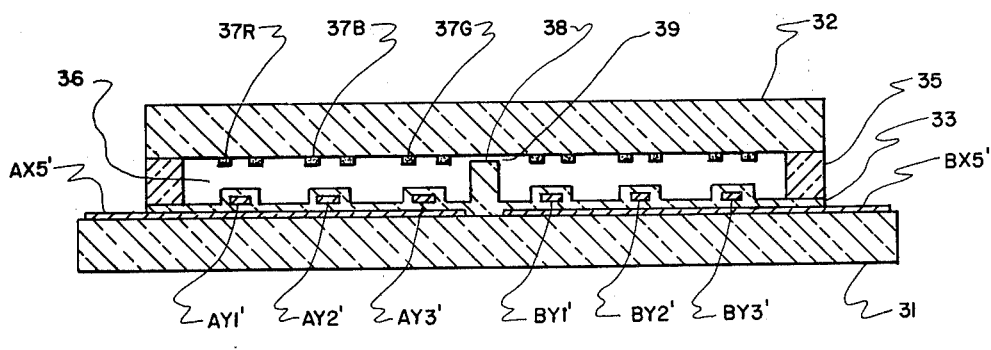
FIG. 4 is a cross-section of FIG. 3.

FIGS. 3 and 4 illustrate a so-called monolithic or planer television gas discharge panel structure. Examples of monolithic panel designs and configurations are disclosed by Lay U.S. Pat. No. 3,646,384; Mayer U.S. Pat. No. 3,860,846; and Schermerhorn U.S. Pat. No. 3,896,327; all of which patents are incorporated herein by reference.

FIGS. 3 and 4 illustrate a monolithic panel device 703' containing panel halves 703A' and 703B'. There is shown a single base substrate 31 containing a first distinct array of X-electrodes AX1', AX2', AX3', etc. in panel half 703A' with two series of leads 82-1, 82-2, etc.

and 84-1, 84-2, etc. The substrate 31 also contains a second distinct array of X-electrodes BX1', BX2', BX3', etc. in panel half 703B with two series of leads 83-1, 83-2, etc. and 85-1, 85-2, etc. A dielectric member 33 covers the two arrays of X-electrodes. An array of Y-electrodes AY1', AY2', etc. in panel half 703A' is embedded within and/or covered by the dielectric 33. An array of Y-electrodes BY1', BY2', etc. in panel half 703B' is embedded within and/or covered by dialectric 33. The dielectric 33 prevents the arrays of Y-electrodes from physically contacting the arrays of X-electrodes. There are two series of leads 80-1, 80-2, etc. and 86-1, 86-2, etc. to the Y-electrode lines AY1', AY2', etc. and there are two series of leads 81-1, 81-2, etc. and 87-1, 87-2, etc. to the Y-electrode lines BY1', BY2', etc.

A gas chamber 36 is formed by the attaching of a transparent envelope or cover 32 to the edge of the substrate 31 with sealing member 35. The sealing member 35 also serves as a spacing member to position and maintain the envelope or cover 32 in a uniformly spaced relationship relative to the gas contacting surface of the dielectric member 33. Additional spacers may be positioned inside of the chamber 36. The gaseous medium is introduced into the chamber 36 with a tubulation (not shown) or by sealing the device in situ of the gaseous medium.

The arrays of X-electrodes and Y-electrodes form X–Y electrode line cross-overs, each cross-over defining a gas discharge cell site as previously noted in the discussion of the planar device 703 in FIGS. 1 and 2. However, in monolithic device 703', the X–Y electrodes are physically separated by the dielectric 33.

The cross-overs of Y-electrodes AY1', AY2', etc. and X-electrodes AX1', AX2', etc. define the gas discharge cell sites of panel half 703A'. The cross-overs of Y-electrodes BY1', BY2', etc. and X-electrodes BX1', BX2', etc. define the gas discharge cell sites of panel half 703B'.

Phosphor material 37R, 37B, 37G is deposited along the inside of envelope 32 within gas chamber 36. The phosphor is arranged such that there is a phosphor triad comprising a repetitive sequence of three consecutive different phosphors 37R, 37B, 37G emitting red, blue, and green light above each three consecutive discharge cell sites along the X-axis.

A guard or barrier 38 may be used to partially separate the panel halves 703A' and 703B'. A gas passage 39 is also provided.

When the panel 703 or 703' is operated as a color television, the cell sites are addressed one row at a time. A row is defined as being composed of a group of cell sites distributed across the width of the panel and along the axis of one X-electrode. Thus the number of rows will be determined by the number of X-electrodes. The addressing of the rows is from the top of the display to the bottom of the display or vice versa. The addressing of the rows is accomplished in two separate passes or sweeps, the odd rows being addressed in one pass and the even rows being addressed in the other pass. This interleaving sweep pattern is the result of the standard transmitted television signal used by the TV industry in the United States to minimize flicker in a CRT television.

When the gas discharge panel device 703 or 703' is used as a color television, such is typically designed with about 485 X-electrodes. This also defines the number of rows as 485. However, the number of X-electrodes and rows can vary. In a color television each series of three consecutive Y-electrodes along each row define in combination with appropriate phosphors a triad of red, blue, and green light output. Each row will thus contain a plurality of triads, the number of Y-electrodes being three times the number of triads. The total number of triads (and Y-electrodes) is sufficient to give a horizontal resolution consistent with the vertical resolution defined by the number of X-electrodes.

Figure 5:
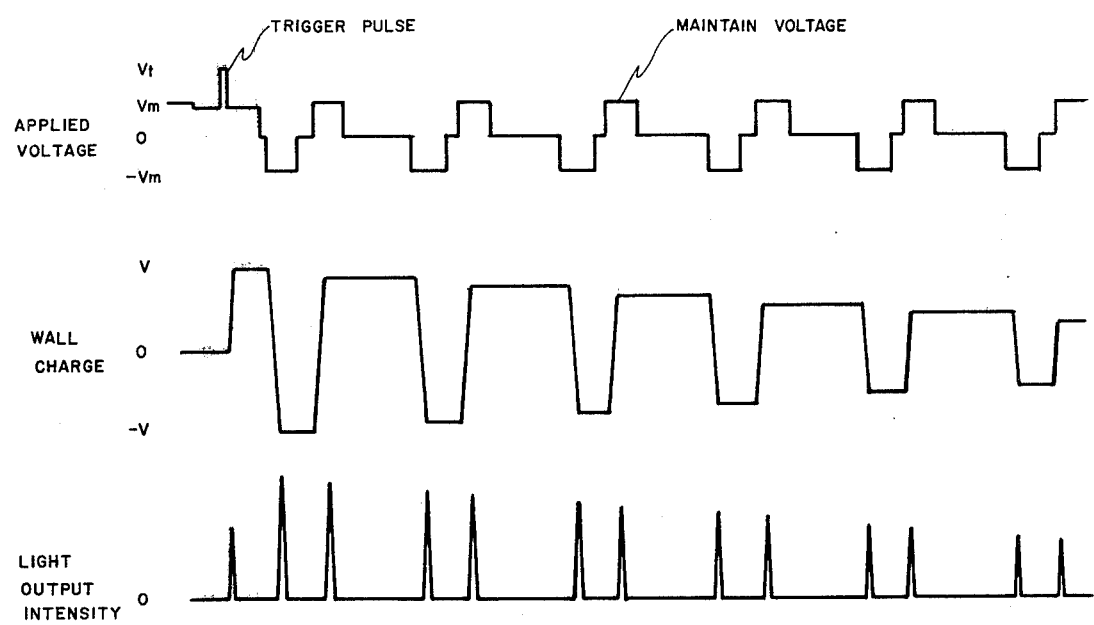
FIG. 5 is a plot against time of the applied wave forms, resulting wall charge, and resulting light output for the multiple light intensity or gray scale operation of one selected gas discharge cell site of the television panel.

There is shown in FIG. 5 the wave forms associated with gray scale operation of a gas discharge cell. In the gray scale mode, an alternating voltage is applied to all sites of the panel, but the magnitude of the voltage is below the lower limit of the bistable range. To distinguish this voltage from the sustaining voltage Vs in the bistable range it shall be referred to as the maintain voltage Vm. Since the maintain voltage is below the bistable range it is not possible to retain a site "on" in the normal way, i.e., to initiate a sequence of discharges which continues indefinitely. However, it is possible by the application of an addressing pulse to initiate a sequence of discharges which continues for a substantial number of cycles before dying out, as shown in FIG. 5. The amount of wall charge transferred in each discharge is somewhat less than that transferred in the preceding discharge. The wall charge voltage alternates polarity each half cycle with diminishing magnitude and eventually the wall voltage, when added to the maintain voltage, is insufficient to cause a discharge and the sequence stops. Since the diminishing unstable sequence of discharges can be maintained for a substantial number of cycles by charges stored on the dielectric insulating surfaces, as in the bistable memory mode, this mode of operation is referred to as the semi-memory mode.

The number of cycles through which the discharge sequence persists depends on many factors such as gas composition, gas pressure, maintain voltage magnitude and wave shape, panel geometry and panel materials. However, if all of these factors are held constant, the length (overall time duration) of the diminishing sequence of discharges may be controlled by varying the magnitude of the trigger voltage. A larger trigger voltage will cause more wall charge, leading to a larger initial wall voltage and a longer sequence of discharges.

If a trigger voltage is applied repetitively to a discharge site at some regular time interval, the corresponding sequence of discharges occurs repetitively and the site will emit light with an average intensity which depends on the length of the discharge sequence (the longer the sequence, the brighter the average light level). If the panel is operated in a television mode and updated at repetition rates fast enough so the human eye does not perceive flicker, the brightness (or luminance) of a site can be controlled by the magnitude and duration of the trigger voltage applied to that site. The larger trigger voltage can also produce discharge pulses which transfer a greater amount of charge such that the individual light pulses are more intense. This can be an additional factor in increasing the average brightness with increasing trigger volume.

FIGS. 6-A through 6-U represent various maintainer pulse and trigger pulse waveforms which are applied to each of the plasma discharge panel halves 703A and 703B. The maintainer cycle time shown is 63.5 microseconds which is the same as a standard United States television picture scan time. FIG. 6-A represents the maintainer waveform alone which is applied to non-selected cells of panel half 703A. The write mode portion of this waveform is defined as that portion of the cycle during which the applied maintain voltage is reduced to near zero immediately following the high voltage level and immediately preceeding the low voltage level. The remainder of the waveform cycle which includes the part of the cycle at the high voltage level, the part of the cycle at the low voltage level and the transition in between is defined as the restore portion of the waveform. To display the information content of a standard United States television transmission, the write mode for this waveform is timed to persist from the time that the line transmission begins to the time $T_1$ on FIG. 6-A. This time interval is approximately 26.75 microseconds (which is half of the approximately 53.5 microseconds of the television video information transmission) plus the pulse width or time duration of a Y-axis partial select video trigger pulse. The elapsed time between the beginning of the transmission of one line and the beginning of the next is 63.5 microseconds. The maintain waveform is shown to enter the write mode again at an interval of 63.5 microseconds to synchronize with the beginning of the second line of transmission and is timed to persist to time $T_3$ when the waveform again enters the restore mode. FIG. 6-B, shows the portion of the maintain voltage waveform that is applied to the X-axis electrodes AX1 through AX5 via leads 84-1 through 84-5 from maintain signal circuit 711A. FIG. 6-C shows the portion of the maintain voltage waveform that is applied to the Y-axis electrodes AY1, AY2, AY3 via leads 86-1, 86-2, 86-3 from maintain signal circuit 711A. These waveforms are combined to produce the composite maintainer waveform represented in FIGS. 6-A.

FIG. 6-D is a composite waveform of the partial selection trigger pulse waveform applied by X-axis pulsers 704A via lead 82-1 and the X-axis maintain signal waveform applied by maintain signal circuit 711A via lead 84-1. This composite waveform is applied to electrode AX1 of panel half 703A to enable writing of the cells along that electrode in the time interval that includes the first half of the television line signal transmission.

FIGS. 6-E, 6-F, and 6-G are the combined signals which are applied to the Y-axis electrodes AY1, AY2, and AY3 respectively. The maintain waveform portions of these signals are applied to electrodes AY1, AY2, and AY3 by circuit 711A via leads 86-1, 86-2 and 86-3 respectively; and the partial select video portions of the waveform are applied to electrodes AY1, AY2, and AY3 by circuit 702A via leads 80-1, 80-2 and 80-3 respectively. The voltage magnitude of the Y-axis partial selection video trigger pulse determines the intensity of the light generated by the selected cell site.

FIG. 6-H shows the composite waveform produced when the waveform of FIG. 6-D is applied to panel electrode AX1 and the waveform of FIG. 6-E is applied to panel electrode AY1. This waveform is applied to panel cell site AX1, AY1, the cell site in the upper left most corner of panel half 703A. With the above timing, the X-axis and Y-axis partial trigger pulses combine to trigger cell site AX1, AY1 at the initiation of the write mode for X-axis electrode line AX1 in synchronism with the timing of the video signal received for the left-most cell site of the first line scan of panel half 703A. The magnitude of the Y-axis partial selection video trigger voltage determines the intensity of the light output from the cell site.

FIG. 6-I shows the composite waveform produced when the waveform of FIG. 6-D is applied to panel electrode AX1 and the waveform of FIG. 6-F (waveform of FIG. 6-C combined with a video trigger pulse approximately half way through the write mode time of panel half 703A) is applied to panel electrode AY2. This waveform is applied to panel cell site AX1, AY2, the cell site in the top middle of panel half 703A. With the above trigger pulse timing the X-axis and Y-axis partial trigger pulses combine to trigger cell site AX1, AY2 in the middle of the write mode for the X-axis electrode line AX1 in synchronism with the timing of the video signal received which corresponds to that cell site position. Here again the magnitude of the Y-axis partial selection video trigger voltage determines the intensity of light output from that cell site.

FIG. 6-J shows the composite waveform produced when the waveform of FIG. 6-D is applied to panel electrode AX1 and the waveform of FIG. 6-G (waveform of FIG. 6-C combined with a video trigger pulse at approximately the end of the write mode time of panel half 703A) is applied to panel electrode AY3. This waveform is applied to panel cell site AX1, AY3, the right most cell of the first line of panel half 703A. With the above timing the X-axis and Y-axis partial trigger pulses combine to trigger cell site AX1, AY3 at the end of the write mode for the X-axis electrode line AX1 in synchronism with the timing of the video signal received which corresponds to that cell site position. As noted the Y-axis partial selection trigger voltage determines the light output from that cell site.

FIG. 6-K represents the maintainer waveform alone which is applied to non-selected cells of panel half 703B. The write mode portion of this wave form is identified. It is similar to that of FIG. 6-A. The initiation of the write mode maintainer waveform for panel half 703B is timed to occur when the incoming video signal is half way through its scan of transmitted information. Thus, the time at which video information is received for the left most cell of panel half 703B line BX1 coincides with the time at which the maintain waveform for all of panel half 703B enters the write mode. To display the television transmission the write mode for this waveform is timed to persist from the time the second half of the line transmission begins (approximately 26.75 microseconds from the beginning of the line transmission) to the time $T_2$ on FIG. 6-K. As described in FIG. 6-A the write mode time interval is approximately 26.75 microseconds plus the pulse width or time duration of a Y-axis partial select video trigger pulse.

FIG. 6-L shows the portion of the maintain voltage waveform that is applied to X-axis electrodes BX1 through BX5 via leads 85-1 through 85-5 from maintain signal circuit 711B. FIG. 6-M shows the portion of the maintain voltage waveform that is applied to the Y-axis electrodes BY1, BY2, BY3 via leads 87-1, 87-2, 87-3, from maintain signal circuit 711B. These waveforms are combined to produce the composite maintainer waveform presented in FIG. 6-K.

FIG. 6-N is a composite waveform of the partial selection trigger pulse waveform applied by X-axis pulsers 704B via lead 83-1 and the X-axis maintain signal waveform applied by maintain signal circuit 711B via lead 85-1. This composite waveform is applied to electrode BX1 of panel half 703B to enable writing of the cells along that electrode in the time interval that includes the second half of the television line signal transmission.

FIGS. 6-P, 6-Q, and 6-R are combined signals which are applied to the Y-axis electrodes BY1, BY2, and BY3 respectively. The maintain waveform portions of these signals are applied to electrodes BY1, BY2, and BY3 by circuit 711B via leads 87-1, 87-2, and 87-3 respectively; and the partial select video portions of the waveform are applied to electrodes BY1, BY2, and BY3 by circuit 702B via leads 81-1, 81-2, and 81-3 respectively. The voltage magnitude of the Y-axis partial selection video trigger pulse determines the intensity of the light generated by the selected cell site.

FIG. 6-S shows the composite waveform produced when the waveform of FIG. 6-N is applied to panel electrode BX1 and the waveform of FIG. 6-P is applied to panel electrode BY1. This waveform is applied to panel cell site BX1, BY1, the cell site in the upper left most corner of panel half 703B. With the above timing the X-axis and Y-axis partial trigger pulses combine to trigger cell site BX1, BY1 at the initiation of the write mode for X-axis electrode line BX1 in synchronism with the timing of the video signal received for the second half of the panel display 703. The video signal at that time contains that information which is to be displayed on the left-most cell site of the first line scan of panel half 703B. The magnitude of the Y-axis partial selection video trigger voltage determines the intensity of the light output from that cell site.

FIG. 6-T shows the composite waveform produced when the waveform of FIG. 6-N is applied to panel electrode BX1 and the waveform of FIG. 6-Q (waveform of FIG. 6-M combined with a video trigger pulse approximately half way through the write mode time of panel half 703B) is applied to panel electrode BY2. This waveform is applied to panel cell site BX1, BY2, the cell site in the top middle of panel half 703B. With the above timing X-axis and Y-axis partial trigger pulses combine to trigger cell site BX1, BY2 in the middle of the write mode for the X-axis electrode line BX1 in synchronism with the timing of the video signal received which corresponds to that cell site position. Here again the magnitude of the Y-axis partial selection video trigger voltage determines the intensity of light output from that cell site.

FIG. 6-U shows the composite waveform produced when the waveform of FIG. 6-N is applied to panel electrode BX1 and the waveform of FIG. 6-R (waveform of FIG. 6-M combined with a video trigger pulse at approximately the end of the write mode time of panel half 703B) is applied to panel electrode BY3. This waveform is applied to panel cell site BX1, BY3, the right-most cell site of the first line of panel half 703B. With the above timing the X-axis and Y-axis partial trigger pulses combine to trigger cell site BX1, BY3 at the end of the write mode for the X-axis electrode line BX1 in synchronism with the timing of the video signal received which corresponds to that cell position.

In summary, FIGS. 6-A through 6-U illustrate how a single first line of video display, identified by the location of cell sites along X-axis electrodes AX1/BX1 of the display panel 703, is scanned in synchronism with the receiving of the first line of a video television transmission. This scanning process is repeated in like manner for subsequent lines of video display, identified by the location of cell sites along X-axis electrodes AX2/BX2, AX3/BX3, etc. For standard United States television transmission each complete television picture frame (complete picture frames are transmitted by the rate of 30 per second) is scanned in two interlaced passes to reduce picture flicker that might be perceived by the eye. For example, the display panel 703 would be operated in the following manner. First, cell sites located along X-axis electrodes AX1/BX1 would be scanned as illustrated above, followed by the scanning of cell sites located along X-axis electrodes AX3/BX3, followed by the scanning of cell sites located along X-axis electrodes AX5/BX5. This would complete the scan of the odd numbered X-axis electrode lines. Next, the remaining even numbered X-axis electrode lines are scanned to complete one picture frame. That is, the cell sites located along X-axis electrodes AX2/BX2 are scanned followed by the scanning of cell sites located along X-axis electrodes AX4/BX4.

Figure 7:
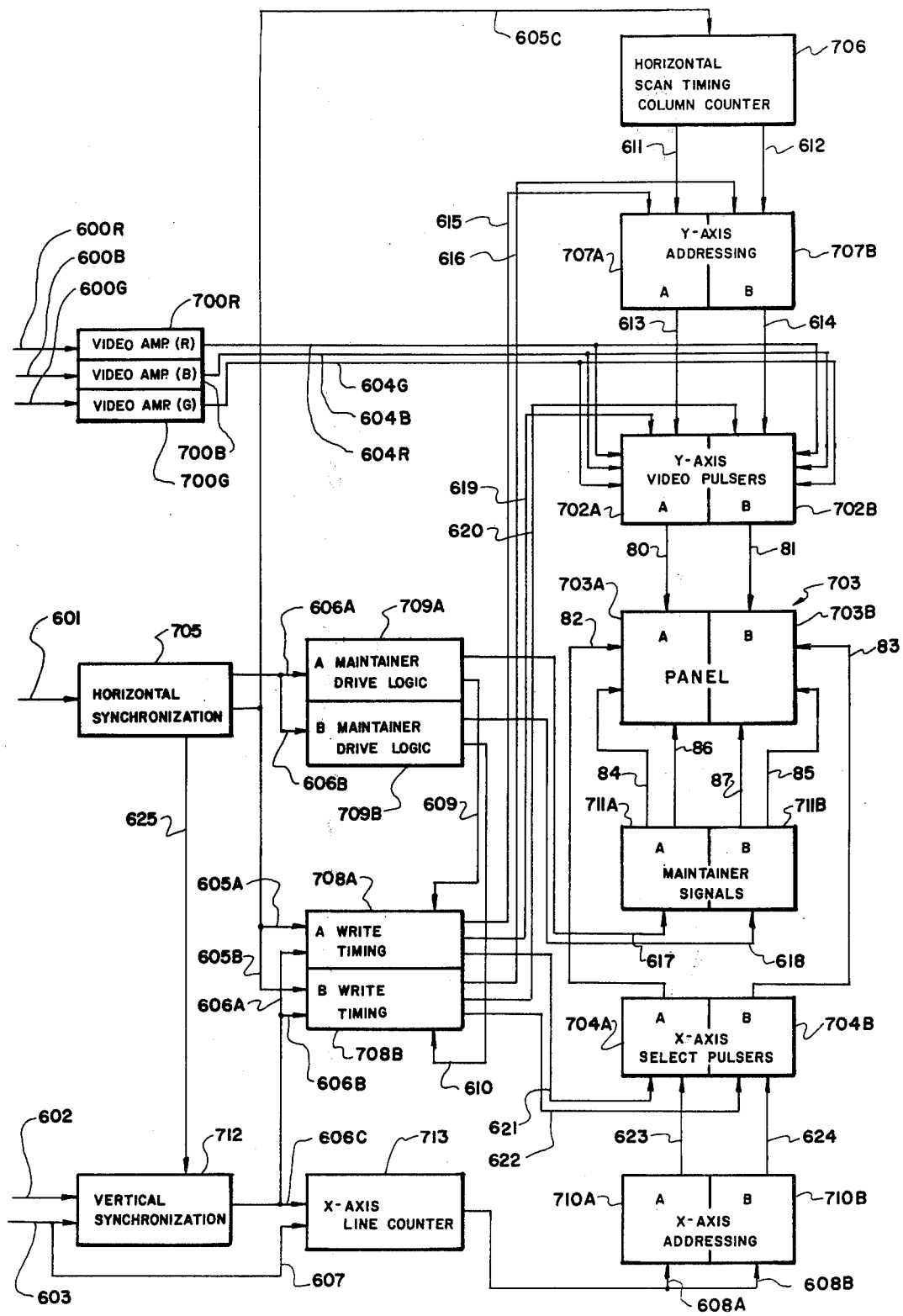
FIGS. 7 and 8 and 9-11 schematically illustrate the electronic circuitry and apparatus for operating the gas discharge television in accordance with this invention.
Figure 8:
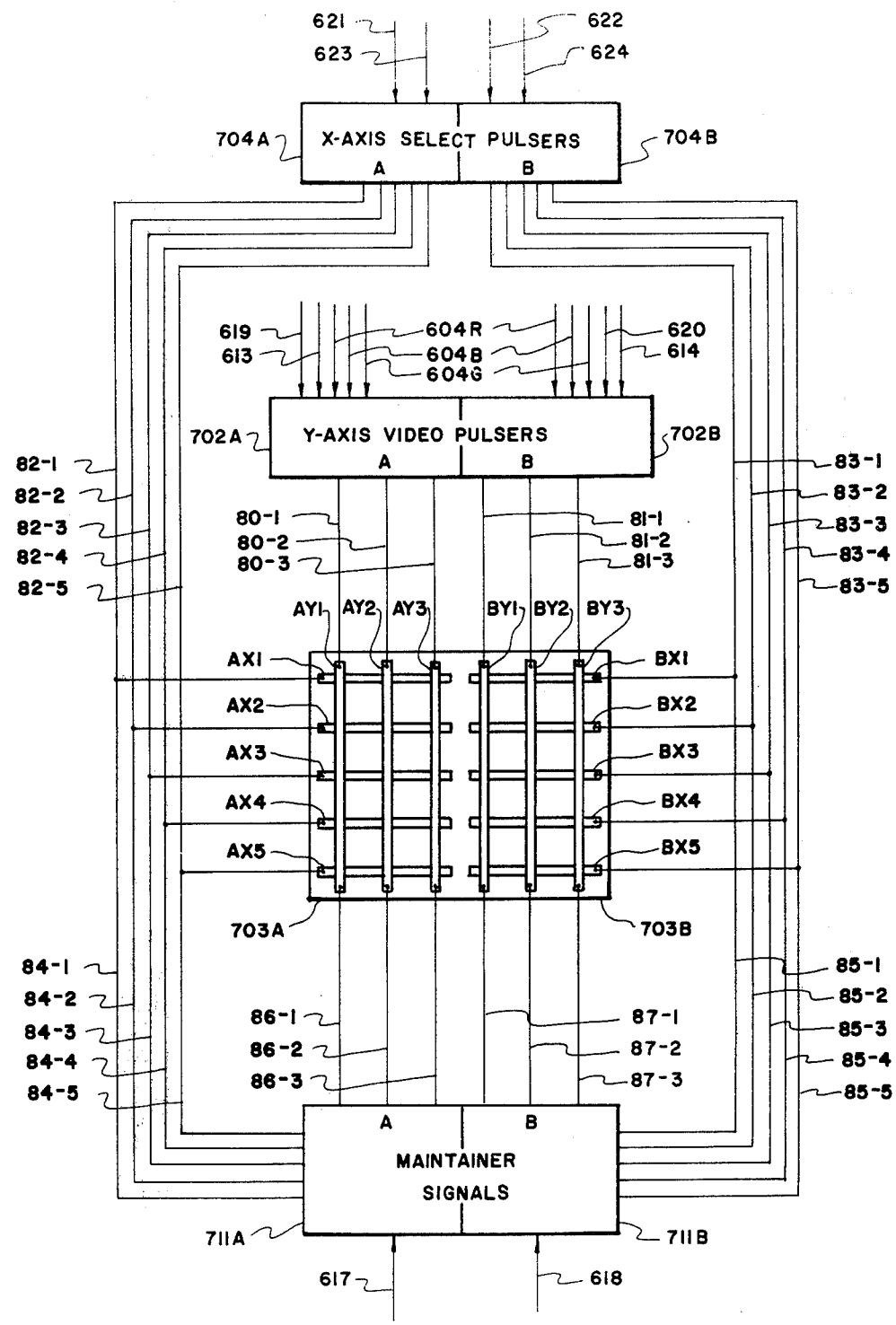

FIGS. 7 and 8 show a schematic diagram of a circuit for generating multiple light intensity or gray scale in two distinct halves of an A.C. gas discharge panel and represent one contemplated best embodiment for practicing the present invention. Each gas discharge panel half is written one X-electrode at a time with all of the cells along each X-electrode being sequentially addressed. In this particular best embodiment a selected X-electrode is supplied with a fixed partial select voltage signal insufficient to ignite or trigger any cell site along the X-electrode, the signal having a time duration equal to the time necessary for combining with a variable voltage signal supplied along a particular Y-electrode. The combination of the partial select voltage supplied along the X-electrode and the partial select voltage supplied along the Y-electrode provides an appropriate trigger voltage at a selected cell site. The magnitude of the trigger voltage is determined by the magnitude of the voltage signal applied to the Y-electrodes, the Y-voltage signal magnitude being determined by the magnitude of the television video signal. Thus, the trigger voltages have magnitudes proportional to the successively sampled instantaneous magnitudes of the external television video signal. When the panel is operated in a so-called semi-memory mode with an alternating maintain voltage, each trigger voltage will generate a sequence of discharges at a cell site which continue but gradually diminish and decay over a number of maintain voltage cycles before fading out. The magnitude of each trigger voltage determines the total number of cycles and total time duration of each sequence of gas discharges. The light output at each cell site, as measured or perceived by the eye, is determined by the total light emitted by all of the gas discharges in the sequence. The relative light output from cell to cell generates the perception of multiple light intensity or gray scale.

The circuit of FIGS. 7 and 8 is supplied with the various components of a standard television signal including a video analog signal 600, a horizontal synchronization signal 601, a vertical synchronization signal 602 and an interlace signal 603. The standard television picture employed in the United States has a width to height ratio of about 4:3. The scanning sequence when the viewer is looking at the picture tube starts in the upper left-hand corner and travels at a uniform rate from left to right along lines that are spaced apart at a constant distance. When the end of a line is reached, the scanning spot quickly returns to the left to start a new line during which time the spot is blanked out. As the scanning spot travels back and forth across the picture tube, it also moves downwardly at a constant rate such that each line is slightly sloped and begins slightly lower than the end of the previous line. In a plasma matrix gas discharge device, this may be accomplished by slightly sloping the X-electrodes in a downwardly left to right direction. When the bottom of the picture is reached, the scanning spot quickly returns to the top of the picture while maintaining the horizontal motion previously described. However, the spot is blanked out during this return.

The scanning CRT spot requires 1/60 of a second to travel from the top to the bottom of the picture and back again. During this time one field of 262.5 lines has been traced. Now a second field is traced wherein the lines lie between the lines of the first field such that the two fields are interlaced. The complete picture comprises 525 lines which have been traced in 1/30 of a second and is called a frame (approximately 485 to 490 of these lines display picture information). This interlacing makes it possible to avoid noticeable flicker while using the lowest repetition frequency for the picture that will satisfactorily portray motion.

In the standard television picture, the blanking pulses for the horizontal retrace are allocated about sixteen percent of the time available for scanning one line or about ten microseconds. Thus the scanning spot moves from left to right in about 53.5 microseconds. Similarly, the vertical blanking pulses occupy between seven and eight percent of the total field time, or about 1250 microseconds.

Synchronization between the scanning operations at the television picture transmitter and at the receiver is accomplished with horizontal and vertical synchronization pulses. The horizontal or line synchronization pulses are five microseconds long and are superimposed on the horizontal blanking pulses. The vertical synchronizing pulses are equal in length to the time required by three lines. Horizontal synchronization is maintained during the presence of the vertical synchronizing pulses by serrations that break up the vertical synchronizing pulse into six "blocks". These serrations have twice the line frequency and are so timed that the rise of every other serration occurs at the instant the horizontal synchronizing pulse would have risen in amplitude if it had been present.

Field frequency irregularities due to the interlacing are minimized by introducing six equalizing pulses, just before and just after the six blocks formed by the serrations, in place of three horizontal synchronizing pulses. These equalizing pulses have twice the repetition frequency of the horizontal synchronizing pulses and are half as long. They maintain horizontal synchronization just as the serrations do and simultaneously provide brief time intervals just before and just after the "blocks" that are identical for both fields of the interlaced scanning pattern.

The standard television signal is modulated on a carrier wherein black is represented by an amplitude that is 75 percent of the maximum envelope amplitude and white is represented by an amplitude that is 12.5 percent of the maximum. The blanking pulses correspond to the black amplitude, while the synchronizing and equalizing pulses occupy the range between 75 percent and 100 percent of the maximum envelope amplitude.

As shown in FIGS. 7 and 8, the color video signals are separated from the carrier by any conventional means and are applied as red, blue, and green video analog signals 600R, 600B, 600G to video amplifiers 700R, 700B and 700G. The amplifiers 700R, 700B, 700G generate three output video signals (red, blue, and green) which are information replicas of the external video analog signals and provide automatic gain control such that the maximum and minimum amplitudes of the video signals are constant for a wide range of input signal strengths. The red color video signal is applied to a first sequence or series of every third one of the plurality of Y-axis video pulsers 702A and 702B.

Likewise, the blue video signal is applied to a second sequence or series of every third one of the Y-axis video pulsers 702A and 702B and the green video signal is applied to a third sequence or series of every third one of Y-axis video pulsers 702A and 702B. The red, blue, and green signals are respectively transmitted from the video amplifiers 700R, 700B, and 700G to the pulsers 702A, 702B via connectors 604R, 604B, 604G. In a black and white television, there would be only one video amplifier 700 and one connector 604. Gas discharge display panel 703 is comprised of two distinct halves 703A and 703B. The Y-axis pulser circuit 702A is connected via leads 80 to the Y-axis electrodes of gas discharge panel half 703A. In FIG. 8 the leads 80 are separately identified as 80-1, 80-2, etc. The Y-axis pulser circuit 702B is connected via leads 81 to the Y-axis electrodes of gas discharge panel half 703B. In FIG. 8 the leads 81 are separately identified as 81-1, 81-2, etc.

Each panel half 703A, 703B is subjected to different maintainer voltage waveforms. When the maintainer waveform to panel half 703A is driven in the write mode, the maintainer in panel half 703B is driven in the restore mode, and vice versa. Thus, the video signals received during the transmission of one line of video information can be applied as received and without storing to the video pulsers 702A and 702B and in turn to the Y-axis electrodes of each display panel half 703A and 703B in real time. A so-called sample and store circuit is not required. Each signal applied by Y-axis video pulsers 702A and 702B is combined respectively with the partial select voltage provided by X-axis select pulsers 704A and 704B so as to apply appropriate trigger voltages at each cell site of a selected X-axis line. Thus the television video information will be displayed by gas discharges along the selected X-axis line electrode. For standard United States television the video information is serially provided from left to right across the display panel. (However, such information can be provided in either direction since the eye can not detect the difference.) In the left to right case, the initiation of the write cycle of the maintain waveform which is applied to panel half 703A via leads 84, 86 is synchronized with the reception of the video transmission which contains the video magnitude information for the left-most cell in the selected line of panel half 703A. With such synchronism the said left-most cell can be triggered or written at the time the video information is received. The maintain waveform which is applied to panel half 703A is timed so that the write mode portion of the maintain waveform persists long enough to receive video information and for scanning and triggering all of the selected cells along the selected X-axis electrode of panel half 703A.

For the display of a standard United States television transmission on a gas discharge plasma panel, the minimum write mode duration for the maintain voltage waveform is approximately 26.75 microseconds plus that time equal to the signal pulse width (time duration) of the video pulsers 702A. The latter signal pulse width time is added so as to allow time for the writing of the right-most cell along the X-axis of panel half 703A.

After the completion of the reception of the video information for all of the cells of the selected line of panel half 703A, the maintainer waveform enters the restore portion of its cycle, while the second half of the panel 703B is scanned.

The initiation of the write cycle of the maintain waveform which is applied via leads 85, 87 to panel half 703B is synchronized with the reception of the video transmission which contains the video magnitude information for the left-most cell in the selected line of panel half 703B. With such synchronism, the said left-most cell can be triggered or written at the time the video information is received. The maintain waveform which is applied to panel half 703B is timed so that the write mode portion of the maintain waveform persists long enough to receive video information and for scanning and triggering all of the selected cells along the selected X-axis electrode of panel half 703B. For the display of a standard United States television transmission, the maintainer waveform is timed to enter the write mode half way through the total line scan of the panel 703 or at approximately 26.75 microseconds from the initiation of the first cell of the X-axis line scan of first panel half 703A. This write mode must persist for the entire second half of the line scan transmission to second panel half 703B. This is a minimum time duration of approximately 26.75 microseconds from the initiation of the lines scan of the left-most cell of the X-axis electrode of panel half 703B plus that time equal to the signal pulse width of the video pulsers 702B.

After the completion of the reception of the video information for all of the cells of the selected line of panel half 703B, the maintainer waveform is timed to enter the restore portion of its cycle while the first half of the panel 703A is again scanned for another X-axis line. For a standard United States television transmission the scanning of another line of panel half 703A would not begin until 63.5 microseconds after the initiation of the previous total X-axis line scan of panel 703. By timing with the write mode portions of the maintain waveform signal, the video trigger voltages applied by Y-axis pulsers 702A and 702B via leads 80 and 81, respectively, write each X-axis line of discharge cells in the semi-memory mode to generate a line of multiple intensity display.

The external horizontal signal 601, vertical synchronization signal 602, and the external interlace signal 603 are separated from the television carrier by conventional means. The external horizontal synchronization signal 601 is applied to a horizontal synchronization circuit 705 which generates signals to control the writing of each of the Y-axis panel lines with the received video signal. Horizontal synchronization circuit 705 applies a clock signal via leads 605C to horizontal scan timing column counter circuit 706. The timing circuit 706 includes counting means responsive to the clock signal for determining which of the Y-axis electrode lines should be addressed in order to maintain synchronism between the received video signal and the X-axis scanning of panel 703. The timing circuit accomplishes the aforementioned by dividing the interval for the transmission of each line of video information into equal segments according to the number of Y-axis electrode lines and sequentially applies column numbers via leads 611 and 612, respectively, to the Y-axis addressing circuits 707A and 707B. Y-axis addressing circuits 707A are connected to Y-axis video pulser circuits 702A via leads 613 which are in turn connected via leads 80 to the Y-axis electrodes in panel half 703A. Y-axis addressing circuits 707B are connected via leads 614 to Y-axis video pulser circuits 702B which are in turn connected via leads 81 to the Y-axis electrodes in panel half 703B. Since multiple intensity color is to be displayed on panel 703, each column number generated by horizontal timing circuit 706 will correspond to the Y-axis addressing of a triad (red, blue, green) of three contiguous cell sites. The addressing of the three contiguous Y-axis cell sites is made via circuits 707A and 707B which are connected to pulser circuits 702A and 702B which are in turn directly connected to the triad of three contiguous cell sites along the X-axis line being scanned in either half of panel 703. The three contiguous cell sites of panel 703 are arranged in phosphor triads of red, blue and green to represent the color transmission of the video signal. Video signals from the video amplifiers 700R, 700B, 700G represent the magnitude values for each of the colors (red, blue and green) and are applied to the Y-axis video pulser circuits 702A and 702B in parallel via connectors 604R, 604B, 604G.

The clock signal from the horizontal synchronization circuit 705 is also applied to write timing circuits 708A and 708B via leads 605A, 605B, respectively, so as to apply a video strobe signal via leads 615, 616, respectively to the Y-axis addressing circuits 707A and 707B. This strobe signal provides a back up timing for the column counter. The addressing circuits 707A and 707B may include a decoder which is responsive to the line number from the column counter and the appropriate video strobe signal thereby generating and applying pulser address input via leads 613 or 614 to Y-axis video pulser circuits 702A or 702B.

The horizontal synchronization circuit 705 also supplies an internal synchronization signal via leads 606A and 606B respectively, to the maintainer drive logic circuits 709A and 709B which control the generation of the maintain signals which are applied to the X-axis lines via leads 84, 85, and to the Y-axis lines of the panel 703 via leads 86, 87. The maintainer logic circuit 709A applies drive signals via leads 617 to maintainer signal circuit 711A and a "restore on" signal via leads 609 to write timing circuit 708A. The maintainer signal circuit 711A generates the maintain signals as a series of alternating waveforms which are applied via leads 84 to the X-axis lines and via leads 86 to the Y-axis lines of display panel half 703A. At the same time the write timing circuit 703A responds to the "restore on" signal via leads 609 to inhibit via leads 619 and 621, respectively, the video pulser circuits 702A and 704A when the maintain signals are not in the desired write mode portion of the maintain waveform. Thus, the maintain signals must be synchronized with the horizontal scan of the column counter such that the write pulse always occurs in the write mode portion of the maintain waveform. The maintain drive logic 709A removes the maintain on or write inhibit signal to the write timing circuit 708A via leads 609 when the maintain waveform has entered the write mode. The maintainer logic circuit 709B applies drive signals via leads 618 to maintainer signal circuit 711B and a restore on signal via leads 610 to write timing circuit 708B. The maintainer signal circuit 711B generates the maintain signals as a series of alternating waveforms which are applied via leads 85 to the X-axis lines and via leads 87 to the Y-axis lines of display panel half 703B. At the same time the write timing circuit 708B responds to the restore on signal via leads 610 to inhibit via leads 620 and 622, respectively, the video pulser circuits 702B and 704B when the maintain signals are not in the desired write mode portion of the maintain waveform. Therefore, the maintain signals must be synchronized with the horizontal scan of the column counter such that the write pulse always occurs in the write mode portion of the maintain waveform. The maintain drive logic 709B removes the restore on or write inhibit signal via leads 610 to the write timing circuit 708B when the maintain waveform has entered the "write" mode.

Therefore, the maintainer drive logic 709A inhibits the write timing logic circuit 708A from applying write signals to X-axis pulsers 704A and Y-axis pulsers 702A when the maintain waveform signal to panel half 703A is in the restore mode. Likewise, the maintainer drive logic 709B inhibits the write timing logic circuit 708B from applying write signals to X-axis pulsers 704B and Y-axis pulsers 702B when the maintain waveform signal to panel half 703B is in the restore mode.

The write timing circuits 708A and 708B are respectively responsive to the restore on signals from the maintainer drive logic circuits 709A and 709B (via leads 609, 610). Each circuit 708A and 708B is further responsive to the clock signals from the horizontal synchronization circuit 705 (via leads 605A, 605B) and the vertical synchronization circuit 712 (via leads 606A, 606B). The circuits 708A and 708B respond to the above applied input signals and apply (via leads 619, 620) output signals to pulsers 702A and 702B, respectively.

The Y write signal enables the addressed pulser circuit 702A or 702B to generate the partial select trigger signal to the addressed cell of display panel half 703A or 703B. The magnitude of the partial select trigger signal voltage is a function of the magnitude of the video signal to be displayed on the addressed cell site. However, the partial select trigger voltage alone is insufficient in magnitude to ignite or trigger any cell site along the Y-axis.

The external vertical synchronization signal 602 is applied to a vertical synchronization circuit 712. The vertical synchronization circuit 712 responds to the external signal 602 and an internal synchronization signal via leads 625 from the horizontal synchronization circuit 705 to apply via leads 606C a clock signal to line counter 713. The line counter 713 generates and applies (via leads 608A and 608B respectively) line numbers to X-axis addressing circuits 710A and 710B, which numbers are advanced in sequence from the top line to the bottom line of panel 703. The line counter 713 includes a counter which is incremented after each horizontal life is written to generate the line numbers.

The external interlace signal 603 is applied to the vertical synchronization circuit 712 and via leads 607 to the X-axis line counter 713 such that a first field of alternate X-axis panel lines are written and then a second field of the remaining X-axis lines are written to display one television picture frame.

Each of the X-axis addressing circuits 710A and 710B includes a decoder which is responsive to the line number for generating a line address to actuate via leads 623 or 624 the selected X-axis pulser circuit 704A or 704B. X-axis pulser circuit 704A applies a portion of the trigger voltage signal via leads 82 to the X-axis electrodes of display panel half 703A. Likewise, pulser circuit 704B applies a portion of the trigger voltage signal via leads 83 to the X-axis electrodes of panel half 703B. The clock signal from vertical synchronization circuit 712 is also applied via 606A and 606B to each write timing circuit 708A and 708B to apply (via leads 621 and 622) X write signals to each X-axis pulser circuit 704A and 704B, respectively, to enable the addressed X-axis pulser to apply the partial select trigger signal voltage on the X-axis (via leads 82 and 83) at the same time that the Y-axis video pulser circuits 702A and 702B are applying the other partial select portion of the trigger signal voltage (via leads 80 and 81). The partial select voltage signal applied to the X-electrode is of insufficient magnitude to ignite or trigger any cell along the X-electrode without the complementary Y-axis partial select signal.

For electronic conditioning of cell sites to be addressed, pilot cells may be provided around the perimeter of the panel. Suitable border sustainer circuits are disclosed in U.S. Pat. No. 3,786,484 (Miavecz); U.S. Pat. No. 3,843,905 (Leuck et al.); and U.S. Pat. No. 3,894,263 (Wojcik) all incorporated herein by reference.

In accordance with the provisions of the patent statutes, the principle means and mode of operation of the present invention has been explained and what is considered to represent its best embodiment has been illustrated and described. However, it is to be understood that the invention may be practiced otherwise than as specifically illustrated and described without departing from its spirit or scope. For example, the trigger signals have been illustrated as squarewave pulses having a constant width and a magnitude proportional to the magnitude of the video signal to be displayed. However, it has been discovered that the duration of the pulses and the shape of the pulses can also be varied to control the number of gas discharges in the sequence.

Thus either or both the width or magnitude of each trigger signal may be varied to control the sequence of diminishing discharges. Furthermore, the positioning of each trigger signal relative to the next maintain pulses may also be controlled. Reference is made to U.S. Pat. No. 4,097,780, issued to Ngo. However, this requires some buffering or a sample and hold technique. Likewise, the geometric shapes of the trigger and maintain signal waveforms may be varied.

FABRICATION OF DISPLAY DEVICE PANEL

The display panel devices 703 and 703' of this invention are constructed using a series of so-called thick film and/or thin film techniques.

In the construction of the parallel plate device 703, the arrays of parallel electrodes are deposited on each substrate 1, 2, using a thick or thin film process. A thick or thin film dielectric portion is then deposited over each electrode array. A red, blue, or green light emitting phosphor is deposited near each gas discharge site. A center crosstalk guard or barrier 8 may also be applied on the surface of one dielectric. The substrates are then sealed together, dielectric surface facing dielectric surface, to form a structure 703 as illustrated in FIGS. 1 and 2. The gaseous medium is added to the chamber 6 by a suitable means such as tubulation.

In the construction of the planar device 703', the arrays of parallel X-electrodes (AXI', BXI', etc.) are deposited on the substrate 31. A first portion of the dielectric 33 is then applied as a cover or coating over the X electrodes. The array of top parallel Y-electrodes are then deposited over the first dielectric portion 33. The remainder of the dielectric portion 33 is then applied over the Y-electrodes.

Phosphor material 37R, 37B, 37G is applied to the inside of the envelope 32. The envelope 32, containing the phosphor, is then sealed to the substrate 31 over the electrodes and dielectric to form a structure as illustrated in FIGS. 3 and 4. The gas is added to the chamber 36 by a suitable means such as tubulation.

Many processes are known in the prior art for the fabrication and assembly of gas discharge display devices. Such processes include applying electrode and dielectric materials to a common substrate, the sealing together of substrates and envelopes to form an enclosure or chamber for an ionizable gas, and the introduction of gas to the chamber. These prior art processes may be utilized to fabricate and assemble the gas discharge device structure of the present invention. Examples of such prior art processes are disclosed in U.S. Pat. Nos. 3,775,999 (Foster); 3,778,127 (Langston, Jr., et al.); 3,837,724 (Haberland, et al.); 3,879,629 (Durand); 3,879,634 (Pfaender, et al.); and 3,909,094 (Gardner). Examples of such processes as applied to the manufacture of monolithic or planar devices are disclosed in U.S. Pat. Nos. 3,811,061 (Nakayama, et al.); 3,860,846 (Mayer); and 3,896,327 (Schermerhorn). The teachings of all of these process patents are incorporated by reference into the present invention disclosure.

SUBSTRATE

In the best mode of this invention, the substrate plates 1, 2, and/or 31 are of a soda lime silica glass composition comprising about 73 percent by weight silica, about 14 percent by weight soda, and about 13 percent by weight calcia. The working surface of the plate, i.e., the surface on which the electrodes and dielectric are deposited, should be flat and free of defects such as scratches, chips, or other blemishes.

It has been found that maximum surface flatness and minimum surface defects are obtained in a soda lime silica glass manufactured by a so-called float glass process; i.e., a glass prepared by floating a molten sheet of glass over a hot molten metal surface, typically molten tin. Such a process is well known in the glass art as illustrated by U.S. Pat. Nos. 3,826,637; 3,843,344; and 3,850,787.

Soda lime silica plate glass manufactured by a molten tin float glass process has a thin layer of tin or tin oxide on one surface. The presence of this tin or tin oxide on the glass substrate surface inhibits the permanent adherence of some electrode materials to the surface. Therefore, the electrodes are preferably deposited on that glass substrate surface which is free from tin or tin oxide.

In another mode of this invention, the substrate is of a ceramic or ceramic-like material containing one or more oxides such as aluminum oxide, silicon oxide, titanium oxide, zirconium oxide, magnesium oxide, lead oxide, and so forth.

Since visible light generated by the monolithic display device 703' is viewed through the envelope 32, the substrate 31 does not have to be optically transparent to visible light. Indeed, the substrate 31 may be opaque, translucent, or optically non-transparent to visible light.

In the parallel plate device 703, the light from the gas discharges is viewed through either substrate. The non-viewing substrate may be opaque, translucent, or optically non-transparent to visible light. In one best mode, a black substance is applied to the monolithic device substrate 31 or the non-viewing substrate of the parallel plate device to provide a black viewing background for contrast and improved viewing of visible light through the envelope 32 or viewing substrate.

The black substance may be applied on the outside surface of the glass substrate as a permanent layer, film or covering. Likewise, a temporary or semi-permanent black wall or body may be positioned adjacent to the outside surface. A black substance may also be applied to the inside surface of the glass substrate before the application of the electrodes and dielectric to this surface if the black substance does not interfere with the adhesion of the electrodes and dielectric to the substrate.

In one mode, a black substance is chemically or physically incorporated into the composition of the substrate. This black substance may be iron oxide, carbon or any other suitable material in small quantities which does not adversely affect the performance of the display device.

Each base or substrate plate is cut to a suitable size, usually about 60 centimeters in width and about 60 centimeters in length, for television size or video display. Larger or smaller dimensions may also be used.

In the preferred practice of this invention, the base or substrate plate has a thickness of at least about ¼ (one-quarter) inch or 5.35 millimeters to provide adequate mechanical and structural support for the fabricated display device. It is important that the substrate thickness be sufficient to withstand any pressure differential between external pressures outside of the gas discharge device and the internal gas pressure within gas chamber. It is especially important that the substrate thickness be sufficient to minimize substrate deflections caused by pressure differentials and other stresses including potential mechanical and thermal stresses arising during fabrication of the device.

The glass substrate is cleaned prior to use. Such cleaning may include chemical treatment such as degreasing with Freon for about 3 to 10 minutes. Any cleaning process may also include scrubbing with a detergent, rinsing with water, and drying. Another substrate cleaning process comprises ionic bombardment in a wet active gas as disclosed by U.S. Pat. No. 3,868,271 incorporated by reference.

ELECTRODES

The arrays of electrodes are applied to the substrate by either a thick film or thin film process. However, a thin film process has been found to be more desirable for the formation of split or divided electrodes. A thin film process is also necessary for a high resolution device such as one containing 60 electrode lines per linear inch.

The thick film electrode process is usually done by means of a silk screen stencil. In such a process, the electrode material is squeezed through the openings of the silk screen stencil or mask and selectively deposited in the desired pattern on the substrate. Such silk screen processes are well known in the prior art.

One thin film electrode process is a photolithographic technique such as disclosed in U.S. Pat. No. 3,926,763 (Reisman) and incorporated by reference into this disclosure. This kind of process is most suitable for depositing the bottom X-electrodes in the monolithic device 703'. The structure resulting from this process is such that the X-electrodes are embedded in the etched surface of the substrate 31 and are essentially coplanar with it.

Specifically, the photolithographic process is used to form a fine-line pattern in masking material which is adhered to the substrate. The substrate is etched out through the mask by either wet chemical or sputter etching techniques. Where unit aspect ratio is desired, sputter etching is preferred. The selected metallurgy such as gold or chrome-copper-chrome is evaporated into the etched surface of the substrate at an elevated temperature above ambient temperature. This precludes the generation of undue surface stresses in the layered structure when the panel is heated during subsequent fabrication steps and operation. The mask and overlying metal are removed by blister peeling or dissolution leaving the pattern of conductors as an embedded metallurgy.

Another thin film process is the photoetching of electrodes. The substrate surface is entirely covered with an electrode material by electron beam or thermal evaporation. A positive or negative photoresist is applied to the substrate over the electrode material by any suitable means such as rolling, spraying, etc., to give a uniform coating of photoresist. The photoresist is dried by heating to a low temperature. The cured photoresist is exposed to radiation, usually visible light in a dark room, through a mask or pattern of the desired electrode array design. The light passing through the mask polymerizes the photoresist. Either the polymerized or non-polymerized photoresist is then removed from the substrate with a solvent leaving exposed electrode material which is then etched away. After the electrode array pattern has been etched, the remaining photoresist is removed by washing the substrate with a solvent.

The electrodes may be constructed out of any suitable electrically conductive material such as a pure metal, metal alloy, or metal compound of silver, gold, platinum, aluminum, magnesium, zinc, titanium, tantalum, indium, zirconium, nickel, tin, tungsten, chromium, copper, hafnium, gallium, cadmium, niobium, ruthenium, and so forth. Laminates of pure metals and alloys may also be used.

Specific alloys include gold-platinum, gold-aluminum, gold-silver, copper-silver, copper-chromium, and so forth.

In one best mode of this invention, the electrodes are a chromium-copper-chromium laminate applied to the substrate by a thin film process of the types described above. Reference is also made to U.S. Pat. No. 3,837,724.

In another best mode of this invention, the electrodes are of near pure gold. Since gold does not readily adhere to glass, a thin layer of tantalum or other substance may first be applied to the glass substrate in order to provide an adhering interface for the gold.

The exact dimensions and spacing of the electrodes will define the television panel resolution in terms of electrode lines per linear inch. Such electrode dimensions will be determined by the rheology of the selected electrodes materials and the method of deposition on the substrates. For thick film gold electrodes applied to a thickness of 10,000 to 14,000 anstrom units, both the bottom X-electrodes and the top Y-electrodes have a width of 9 mils. For a divided or split electrode arrangement, each split electrode is composed of two halves, each half being 3 mils wide with a window or opening between halves which is 3 mils wide. The spacing between adjacent X or Y electrodes is at least 3 mils depending upon the desired resolution. A mil is defined as one thousandth (0.001) of an inch.

In a chromium-copper-chromium electrode system, both the X-electrodes and the Y-electrodes have a width of only 4 mils. Each split or divided electrode is divided into two halves, each half having a width of about 1.5 mils. The opening or window between the halves has a width of 1 mil. The spacing between adjacent X or Y electrodes is at least 1 mil depending upon the desired resolution.

The electrodes are extended through the seal portion around the perimeter of the device for terminal connections outside of the gas chamber. The dielectric may also be extended through the seal with the electrodes into the terminal connecting area.

The electronic circuits for driving the display panel are attached to the extended electrode terminals by any suitable technique such as thermal compression bonding, compliant bonding, and ultrasonic bonding, with or without a so-called wobbling technique.

In one mode of this invention, the electronic driving circuits are comprised of a plurality of semiconductor or integrated circuit chips which are mounted directly on the panel substrate. The attaching of these integrated circuit chips to the panel substrate can be done by beam lead welding such as disclosed in U.S. Pat. No. 3,920,949.

In another mode the semiconductor or integrated circuit chips are mounted on lead current tape or on a tape-carrier package which is in turn attached to the substrate.

DIELECTRIC

In the monolithic device structure, the dielectric applied over the bottom X-electrodes must be capable of physically, mechanically and structurally supporting the array of top Y-electrodes applied over the first dielectric portion without flexure or movement of the electrodes. Such dielectric support of the Y-electrodes is especially important during the various process thermal cycles. Thus, it is absolutely essential that the supporting dielectric portion not become soft and flow or develop cracks and flaws during the application of the Y-electrodes or during the application of a second dielectric portion covering the Y-electrodes or during the sealing together of the envelope 32 and substrate 31.

In either device 703 or 703' the dielectric must be chemically compatible with the selected electrode material, typically gold in one best mode of this invention, and must have thermal expansion characteristics compatible with the substrate(s) and/or envelope.

In one best mode of this invention, the dielectric for both the parallel plate device 703 and the monolithic device 703' is a devitrified lead-zinc-borate dielectric glass composition of the type disclosed in Claypoole reissued U.S. Pat. No. 25,791. Such a glass composition meets all of the above requirements. The ingredients and proportions of this glass composition before devitrification are 65 to 86 percent by weight lead oxide, 5 to 15 percent by weight zinc oxide, 5 to 15 percent by weight boric oxide, 0.5 to 5 percent by weight aluminum oxide, and 0.5 to 5 percent by weight silicon oxide. Small amounts of other metal oxides such as copper oxide, antimony oxide, etc., may also be present.

This lead-zinc-borate glass composition is made into a very fine (less than 100 mesh) powder and mixed with an organic binder and vehicle to form a slurry or suspension. This slurry or suspension is applied to the substrate 1 with a screen printer as a thick film of dielectric glass over the array of electrodes. The thick film of dielectric glass is then heated and devitrified, using, for example, the thermal cycles disclosed in the above mentioned Claypoole patent, incorporated by reference.

In another mode, there is used a thick film of a non-devitrifiable lead borosilicate glass composition. The ingredients and proportions of this composition are 60 to 80 percent by weight lead oxide, 5 to 30 percent by weight boric oxide, 1 to 30 percent by weight silicon oxide, 0 to 8 percent aluminum oxide, 0 to 10 percent calcium oxide, 0 to 10 percent magnesium oxide, 0 to 10 percent zinc oxide, and 0 to 5 percent alkali metal oxides. Specific examples of such composition, including a method of application, are disclosed in Sherk U.S. Pat. No. 3,917,882 and Sherk, et al., U.S. Pat. No. 3,923,530. Both of these patents are incorporated by reference into this disclosure.

In the fabrication of the monolithic device structure the top Y-electrodes are applied over the first portion of the dielectric; i.e., the devitrified glass dielectric. In the best mode, the application of the Y-electrodes is by a thin film process.

A second dielectric portion is applied as a thick film over the Y-electrodes. This second dielectric portion can be a devitrified glass composition or a non-devitrified glass composition, both as described above.

Therefore, in the monolithic structure the dielectric layer 33 is a laminated structure of several layers, the first dielectric sub-layer portion being applied over the array of X-electrodes AX1, AX2, BX1, BX2, etc. and substrate 31 and the second dielectric sub-layer portion being applied over the array of Y-electrodes AY1, AY2, BY1, BY2, etc. and first dielectric sub-layer portion.

The cross-talk guards 8 and 38 are also dielectric material and may be applied simultaneously with the application of the dielectric portion. These guards may also be applied independently as a separate dielectric portion.

In the best mode of this invention, a homogeneous thin film overcoat of dielectric material having a high coefficient of secondary emission is applied to the gas contacting charge storage, working surface of each dielectric member. An excellent material is magnesium oxide applied to a thickness of about 150 to 25000 angstrom units using high energy vacuum deposition, electron beam evaporation, plasma flame, plasma arc spraying, and/or sputtering target techniques. The presence of this homogeneous thin film overcoat serves to improve voltage uniformity and increases the life of the discharge device. It also decreases the magnitude of the voltages necessary for operating the device.

Other thin film materials include oxides of lead, cesium, and the rare earths. Dual or multiple overcoats of thin film dielectrics may be used. In such modes the top thin film overcoat is a material of high secondary emission as described above. Each sub-layer of thin film (beneath the top overcoat) can be a material as described for the top overcoat or a different material such as an oxide of aluminum, silicon, zirconium, and titanium. In addition to the metal oxides listed above, thin films of metal halides, nitrides, and carbides are also used.

Dielectric depressions or grooves may be conveniently etched by known processes into the top surface of the dielectric member before the application of the thin film overcoat. These grooves help focus the discharge. In one etching process, a positive or negative photoresist is sprayed onto the dielectric surface. The photoresist is exposed to radiation through a mask in the desired pattern of grooves or depressions. The exposed portion is polymerized by the radiation. The polymerized or non-polymerized photoresist is removed from the dielectric by washing with a solvent. An etchant is applied by spraying or emersing those dielectric surface areas where the photoresist has been removed. The etchant is a weak acid, such as a 5 percent concentration of nitric, acetic, and/or phosphoric acid. The depth to which the dielectric is etched is a function of the acid temperature and concentration and the quantity of acid applied to the dielectric. After etching, the remaining photoresist is washed from the dielectric.

The gas contacting working dielectric surfaces of the dielectric depressions or grooves are covered with a thin film overcoat of high secondary coefficient material such as magnesium oxide, rare earth oxide, lead oxide, cesium oxide, etc. as discussed hereinbefore.

In one very best mode of this invention, one dielectric member on a nonviewing substrate is a so-called black glass dielectric for improvement of the light contrast for visual display.

The black glass dielectric is obtained by adding a small amount (up to about 5 percent by weight) of blackening agent to the dielectric glass compositions mentioned above. One example of a good blackening agent is a mixture of iron oxide and cobalt oxide. A commercially available iron oxide-cobalt oxide composition is Black Dry Paint No. 41117, available through the Drakenfield Division of Hercules Powder Company, Washington, Pennsylvania.

A non-devitrifiable glass composition containing a high proportion of lead oxide can be blackened by heating to a softening or curing temperature in a reducing atmosphere such as nitrogen.

All or part of the dielectric can be black. In one especially best mode, all of the thick film dielectric is black (including the first and second dielectric sub-layers in the monolithic structure) and the cross-talk guards 8 or 38. In some modes, the dielectric thin film overcoat may also be black.

If the display device of this invention is to be part of a television or computer system utilizing rear projection, then it will be necessary to omit black in the substrate and/or dielectric in order to take advantage of the panel's "see-through" characteristic.

GASEOUS MEDIUM

The ionizable gaseous medium is a pure gas component or a mixture of one or more gas components selected from neon, argon, xenon, krypton, helium, or nitrogen. Other gases such as CO, $CO_2$, and hydrogen are also contemplated.

In one best mode of this invention, there is used a basic gaseous mixture of 10 to 90 percent atoms of argon and 90 to 10 percent atoms of xenon.

Gaseous medium mixtures containing argon, xenon, and/or krypton, are particularly beneficial for the exciting of phosphors. Small quantities of gaseous mercury may also be present in the ionizable gaseous medium for the stimulating or exciting of a particular phosphor. Helium may be added as a buffering agent.

For best performance and optimum brightness in color television, 100 percent pure rare gas, preferably xenon, krypton, or argon, are used in the best mode of this invention.

Helium is poor for excitation of phosphors and neon gives an orange light output. However, small quantities of either may be used in some applications, particularly in a black/white television.

The pressure of the ionizable gaseous medium within the gas chamber 6 or 36 ranges from about 0.1 atmosphere to about 2.0 atmospheres where an atmosphere equals 760 millimeters of mercury.

The ionizable gaseous medium may be introduced into the gas chamber through a tubulation after the device has been sealed together. Although the tubulation is not illustrated in the FIGS. 1 to 4, the use of gas tubulation is well known in the literature. In the Baker, et al., U.S. Pat. No. 3,499,167, the tubulation is illustrated as extending perpendicularly through the substrate near the border.

Also in DeVries, et al., U.S. Pat. No. 3,862,447 (incorporated by reference), the tubulation is shown as extending along the perimeter or edge of the panel adjacent to the seal.

The tubulation arrangements of Baker, et al., or DeVries, et al., are satisfactory for this invention. However, in one best mode of this invention, the tubulation extends at an angle through the seal into the chamber 6 or 36. This can best be done at a corner.

After the gaseous medium is introduced into the chamber, the tubulation is sealed off as disclosed by Baker, et al., and/or DeVries, et al.

In another practice of this invention, the device is sealed together inside of an enclosed chamber containing the ionizable gaseous medium. In this practice, the tubulation is not necessary since the sealing of the chamber 6 or 36 is in situ of the gas and the chamber is automatically filled with gas as the sealing is done. The resulting device 703 and 703' is filled with the gas and does not contain any unsightly, fragile tubulation.

The gaseous medium is gettered of all impurities before it is introduced into the chamber 6 or 36. The device 703 or 703' is also typically baked at elevated temperatures to drive off impurities in the dielectric and/or phosphor introduced during manufacture. This baking of the device is before the introduction of the gettered gaseous medium.

The gaseous medium must be conditioned within the gas discharge display device. This can be done by the use of so-called gas discharge pilot cells which are continuously maintained in the on-state. Such cells are typically located around the perimeter or edge of the device near the seal. A masking arrangement may be provided to hide the pilot cells from the eye of a viewer.

Other conditioning methods are also possible such as the providing of a radioactive substance within the panel.

Conditioning techniques, including the need for same, are discussed in Bitzer, et al. U.S. Pat. No. 3,559,190 and Baker et al. U.S. Pat. No. 3,499,167. Both patents are incorporated by reference.

PHOSPHOR

In the practice of this invention to produce a multicolor visible light television display, three consecutive X-Y cross-overs (discharge sites) in the direction of the panel width (along the X-axis electrodes) interact together to produce a visible light color spectrum, the gas discharge at each X-Y cross-over exciting a different phosphor which emits a different primary color visible light output (red, blue or green). In order to obtain optimum color integration (mixing) of the three primary color outputs, the physical distances along the width of the panel between three consecutive X-Y cross-overs are relatively close together.

In order to produce gradations in both the hue and the intensity of an image as perceived by the viewer, the "gray scale" technique as discussed herein is used to modulate the intensity of the light emitted from the phosphor at each cell site and thus the collective light emitted from each triad or triplet of red, blue and green phosphors which are respectively positioned at three contiguous or consecutive gas discharge cells along the width of the panel.

In the construction of a parallel plate device 703, the phosphor members are illustrated in FIGS. 1 and 2 as being in the geometric shape of continuous donuts or rings surrounding each discharge cell site. However, other suitable geometric shapes may be utilized which position the phosphor member adjacent to the gas discharge cell site. Such geometric shapes may be continuous or discontinuous and may completely surround the cell site or may be positioned near or adjacent only one side of the cell site. The phosphors are on one or both dielectric surfaces inside of the gas chamber.

In a monolithic device 703' of the type shown in FIGS. 3 and 4, each phosphor may also be a donut or ring on the dielectric surface surrounding each discharge cell site. Other geometric configurations may be used with a continuous or discontinuous design. The phosphor members may also be positioned on the inside of the envelope within the gas chamber (as is actually illustrated by FIGS. 3 and 4) above each gas discharge cell site. Those are shown in FIGS. 3 and 4 as donuts, but may be solid bars, stripes, etc. positioned on the inside of the envelope directly above each gas discharge cell site.

The phosphor members 7 or 37 are applied to the glass envelope or dielectric as triplets. Each phosphor triplet member is of a different photoluminescent phosphor material which (when stimulated by ultraviolet radiation) emits light of a different color (red, blue, or green). These phosphor members are arranged in a repetitive pattern (red, blue, green) so that each successive triplet of phosphor bars is substantially like each adjacent triplet of phosphor bars.

In some particular panel uses, the phosphor may produce light of a color other than red, blue or green. In other panel uses, not involving television or video, all of the phosphors may produce color of the same output.

Some panel designs will involve doubles or triplets of one particular phosphor. In this kind of panel design, there are two or three adjacent phosphor members producing the same color output in a multiple intensity and brightness. This is especially necessary where a particular phosphor emitting color (usually blue) is of a weak intensity and brightness relative to the colors (red, green) emitted by the other phosphor members.

The phosphor members do not have to be of equivalent size or width. In order to offset differences in intensity and brightness for each color, one phosphor member (such as blue) having a weak light emitting intensity may have a greater size or width relative to the other phosphor members (green, red).

Each photoluminescent phosphor member is of a phosphor material which is excited by light, typically ultraviolet radiation of about 500 to about 4000 angstroms. In a television or video application, the phosphor upon excitation emits visible light in the red, blue, or green region of the visible light spectrum.

The selected phosphors must be free of all impurities. Efficiency and brightness falls off very fast as contaminants begin to appear.

The photoluminescent phosphor is typically an inorganic material. Organic materials can be used providing such do not break down during the heat cycle of the device manufacture or during the operation of the device.

A wide range of inorganic phosphor materials are used. Such materials include oxides, halides, silicates, borates, sulfides, titanates, phosphates, halophosphates, tungstates, arsenates, germanates, vanadates, of zinc, silver, cadmium, silicon, indium, tellurium, thallium, gallium, magnesium, strontium, calcium, barium, thorium, scandium, yttrium, vanadium, and the Lanthanide Series rare earth elements.

Such phosphors are generally self-activated or doped with small activating amounts of zinc, calcium, magnesium, manganese, scandium, yttrium, silver, tin, uranium, nickel, cadmium, copper, thallium, tellurium, lead, antimony, thorim, and the Lanthanide rare earths, especially europium, terbium, cerium, samarium, praseodymium, erbium, dysprosium, holmium, thulium, and ytterbium.

Some specific examples of phosphors which emit red visible light include magnesium germanium activated with divalent manganese; magnesium fluorogermanate activated with divalent manganese; aluminum oxide activated with rhodium; aluminum oxide activated with chromium; zinc cadmium sulfide activated with copper or silver; cadmium borate activated with divalent manganese; magnesium titanate activated with divalent manganese; calcium orthophosphate activated with tin in the stannous state; and zinc selenide or zinc cadmium selenide activated with copper.

Specific phosphors which emit blue visible light include a host matrix of strontium phosphate activated with ytterbium; zinc sulfide activated with zinc or silver; calcium oxide and tungstic oxide activated with lead; and cadmium tungstate activated with uranium.

Specific phosphors which emit green visible light include magnesium gallate activated with divalent manganese; zinc silicate activated with divalent manganese; zinc-cadmium sulfide activated with zinc or silver; and zinc cadmium borate (can be modified with gallium oxide) activated with trivalent terbium.

In one best tri-color mode, the red emitting phosphor is zinc selenide or zinc cadmium selenide (with an 8:1 mole ratio of zinc to cadmium) activated with 0.003 to 0.03 percent by weight copper; the blue emitting phosphor is zinc sulfide activated with 0.005 to 0.025 percent by weight silver; and the green emitting phosphor is zinc silicate activated with 0.1 to 3 percent by weight manganese.

In one best mode the phosphor bars 7 or 37 are applied by a photographic technique, each phosphor (red, blue, green) typically being applied in a separate step. Such photographic processes are well known. Examples of such processes for depositing phosphor particles on a glass substrate are disclosed in U.S. Pat. Nos. 3,856,525; 3,406,068; and 2,920,959.

The phosphor can also be applied to the glass substrate by a silk screen stencil process as disclosed for example in U.S. Pat. No. 2,625,734.

In one embodiment of the silk screen process, as disclosed in U.S. Pat. No. 3,753,759, a solvent or vehicle suspension of phosphor is applied through the silk screen stencil to the surface of a glass substrate. The vehicle or solvent is then removed by heating and drying, leaving the phosphor deposited on the substrate. The phosphor is then fixed to the surface with a coating of a suitable adhesive which will not adversely affect the operation of the device. An example of such a process is disclosed in U.S. Pat. No. 2,797,172.

In another suitable process for applying the phosphor bars, a tacky or adhesive material is first applied to the glass in the desired phosphor pattern by a silk screen or other printing process. Phosphor particles are then dusted over the tacky glass surface. This sequence is repeated once for each phosphor. The glass envelope or substrate is then heated for a short period of time to evaporate the solvents in the tacky material and bond the phosphors.

Some phosphors may deteriorate (with a decreased life span) when heated to elevated temperatures in the presence of oxygen. For example, a phosphor may darken when heat fused in air to the inside of the glass envelope substrate or when the display device is baked out in air. Some phosphors will also deteriorate when directly exposed to a gas discharge.

Phosphor deterioration can be decreased if the phosphor is coated with a protective layer which is chemically inert to the phosphor and thin enough to be transmissive to ultraviolet radiation of a wave length between 500 and 4000 angstrom units. Depending upon the particular material, the thickness of the protection layer ranges from 100 to 3000 angstrom units.

Examples of materials which can be used as the protective layer are oxides, sulfides, halides, silicates, and borates of elements such as chromium, zinc, aluminum, magnesium, beryllium, silicon, potassium, sodium, rubidium, cesium, strontium, calcium, thorium, and cerium.

Specific protective materials for phosphors are aluminum oxide, thorium oxide, calcium oxide, zinc oxide, magnesium oxide, magnesium fluoride, strontium bromide, potassium chloride, sodium chloride, cesium silicate, rubidium silicate, potassium silicate, cesium borate rubidium borate, potassium borate, silicon oxide, and zinc sulfide. The phosphor protection layer may be a mixture or a laminate of two or more materials. In one particular laminate mode, there is used a first layer of aluminum oxide and a second layer of magnesium halide.

The phosphor can be coated with a pure metal which is then oxidized. In some applications, the pure metal may be used as the protective material.

The phosphor can first be applied to the envelope or substrate and then coated with the protective material. This results in the phosphor being overcoated only on that portion not exposed to the gas discharge.

Since some phosphors will deteriorate when heated, i.e., during the application of the phosphor to the envelope, the phosphor is usually pre-coated with the protective material. This is done by over-coating or encapsulating phosphor particles with the protective material.

In one specific encapsulation process, the phosphor particles are suspended or slurried in an aqueous medium of the protective material and then dried by a spray drying process. In another encapsulation process, the protection layer is applied by a sputtering, vacuum evaporation, or like technique.

In one best mode of this invention, a phosphor such as zinc cadmium sulfide is encapsulated with a layer or overcoat of 500 to 3000 angstrom units of aluminum oxide, silicon oxide, or magnesium oxide. In another best mode, the phosphor is encapsulated with 100 to 500 angstrom units of magnesium halide, particularly magnesium fluoride.

It is highly desirable to employ non-luminescing, light absorbing, or opaque masking material in between or around the phosphor bars to improve the contrast of the visible light output of the panel. In the monolithic device the masking material is applied to the inside of the envelope as a coating and dried. The coating is a slurry or suspension of fine pulveulent masking material such as black iron oxide, mica, molybdenum disulfide, manganese carbonate, ceramic black, or graphite. In one specific best mode, there is used colloidal graphite diluted to 3 percent by weight solids in deionized water. The slurry or suspension coating is heat dried on the glass envelope surface.

The contrast ratio of the visible light output from the panel is improved by placing a neutral density light filter or light polarizing member over the exterior viewing surface of the envelope or viewing substrate. This member can be a glass or plastic cover plate structure positioned adjacent to the envelope. It can also take the form of a thin or thick film of plastic or glass material applied to the exterior surface of the envelope. Likewise, the glass composition of the envelope or viewing substrate may be selected for light filtering or polarizing properties. In addition an antiglare finish or mat surface can be applied to the exterior most surface of the viewing medium or structure used for improving contrast ratio.

ASSEMBLY AND SEALING

The assembly and sealing of the substrate 1 to the substrate 2 in device 703 or the envelope 32 to the substrate 31 in device 703' is the final fabrication step. The seals 5 or 35 may be a vitreous or devitrifiable glass. The seal may be screen printed on the substrate (or envelope) or it may be a glass rod or granular sealant. Spacer elements may be positioned along the panel perimeter as part of the seal and also in the viewing area between discharge sites and/or top of the crosstalk preventive guard. These spacer elements help maintain a relatively constant distance between the inside surfaces of the substrates 1 and 2 or the envelope 32 and substrate 31. U.S. Pat. Nos. 3,778,127 and 3,973,815 disclose the assembly and sealing of the gas discharge panels. These patents are incorporated herein by reference.

TELEVISION OPERATION

For television operation with NTSC (National Television System Committee) United States broadcasting standards there are 525 lines of transmission. The gas discharge display matrix of this invention has about 470 to 500 X-axis electrodes, typically about 483 to 491 electrodes, about one electrode for each line of video transmission contained in a complete picture frame. No X-axis electrodes are provided for an additional 25 to 55 lines, typically 35 to 40 lines of transmission which do not contain video information. These lines occur during the vertical blanking time of a standard television transmission. Additional electrode lines can be provided for pilot cells.

The minimum number of Y-axis electrodes required to display all significant video information provided by the television signal is dependent upon the frequency bandwidth of the television signal. Under present standards television channels have a bandwidth of about 6 megahertz; however, only about 4 megahertz bandwidth is generally allocated for video information. With the 4 megahertz video bandwidth and the standard line scan frequency of 15,750 hertz, theoretically about 215 cycles of the 4 megahertz picture signal is defined along each line scanned.

The total number of picture elements provided along each X-axis is generally a function of the overall picture display size. Typically a lesser number of picture elements is provided for a smaller display relative to the total number provided for a larger display. Of course, the overall acceptability of a particular picture display is subjectively determined by the viewer. A factor which influences the viewer's judgement is the moiré interference patterns which may appear in the picture. The moiré interference patterns may be reduced by increasing the number of picture elements provided along the X-axis. In larger monochromatic television displays having a diagonal greater than 15 inches about 430 to 655 horizontal picture elements (Y-axis electrodes) are generally provided for acceptable viewing.

For a smaller monochromatic television display with a diagonal dimension of 9 inches, the total number of picture elements (Y-axis electrodes) is as low as about 300. A lesser number of Y-axis electrodes may be used especially for a smaller size television.

If the television is to be used for color display, the total number of Y-axis electrodes will be increased by three times for the red, blue, green phosphor triads provided at each picture element. This corresponds to a total of 900 Y-axis electrodes in the 9 inch diagonal television.

For larger color television displays having a diagonal dimension of 15 or more inches, there is provided approximately 430 to 655 phosphor triads or 1290 to 1965 Y-axis electrodes.

Therefore, for a monochromatic television display the total number of Y-axis electrodes (corresponding to the total picture elements to be displayed) will range from about 300 to 655 depending upon the physical size of the display. If the television is to be used for color display, the total number of Y-axis electrodes will range from about 900 to 1965. This corresponds to 300 to 655 phosphor triads.

The foregoing has been described with reference to television broadcasting in the United States, specifically the NTSC standards. For countries other than the United States, there may be different television broadcasting standards. Thus if the useable video bandwidth is increased from 4 to 5 or more megahertz, there may be used more than 655 Y-axis electrodes in a monochromatic display or more than 1965 Y-axis electrodes in a color display.

The Y-axis electrodes spacing for monochromatic or color pictures is designed to provide NTSC standard overall picture proportions of 4:3 making the picture width 1.33 times the picture height. The resolution for the Y-axis electrodes does not have to be the same as the resolution for the X-axis electrodes.

If there is used a substrate which is 60 centimeters by 60 centimeters (23.62 inches by 23.62 inches) and if all of the width is used for viewing, the Y-axis resolution for a FIG. 1 color display (with 1290 to 1965 Y-axis electrodes) will be about 54 to 83 electrodes per inch. If there is used standard overall picture proportions of 4:3, the viewing length will be about 45 centimeters (17.71 inches). The resulting X-axis resolution for a FIG. 1 color display (with about 485 X-axis electrodes) will be about 27 electrodes per inch. For a constant number of electrodes these resolutions for both the X-axis and Y-axis electrodes will decrease with increased linear dimensions and will increase with decreased linear dimensions.

For a small monochromatic display which is 25 centimeters wide by 25 centimeters long (9.84 inches by 9.84 inches), the Y-axis resolution for 300 to 400 Y-axis electrodes will range from about 30 to 40 electrodes per inch. The resulting X-axis dimension will be 18.75 centimeters (7.38 inches). For 485 X-axis electrodes the resolution will be 65.7 electrodes per inch.

At the lower electrode resolutions, e.g., less than about 40 electrodes per linear inch, the electrodes can be applied by thin or thick film processes. At the higher resolutions, e.g., greater than about 50 electrodes per linear inch, the electrodes are usually applied by thin film processes.

The electron beam scanning pattern of a conventional cathode ray tube (CRT) television receiver produces scan lines which are tilted at approximately 0.07 degrees clockwise from the horizontal. This is the result of the simultaneous application of vertical and horizontal beam deflection waveforms on the CRT electron beam. The first field of interlaced scan lines begins at the upper left-hand corner of the television picture and ends in the lower center of the picture. The second field begins in the upper center of the television picture and ends in the lower right-hand corner of the picture. In the practice of this invention, depending upon the overall design of the television system, the X-electrodes may or may not be tilted the conventional 0.07 degrees.

All of the foregoing has been described and illustrated with references to NTSC television broadcasting. Different electrode requirements and designs may be utilized for closed circuit or cable television. In some security or military applications, extremely low or high resolutions may be appropriate. In any case, the specialized requirements of any particular television system are within the overall scope of the present invention.

TELEVISION ADVANTAGES OF THE INVENTION

The principal advantage of the present invention is that a NTSC United States broadcasting standard television transmission can be displayed on a gas discharge television display in real-time with full picture element resolution, standard picture repeation rate (30 picture frames per second), gray scale (variable light intensity) output from each picture element and color preception from triads of red, blue, and green light emitting cell sites comprising each picture element. One of the most economic advantages is the real-time utilization of the received television signal with no intermediate storage of that television signal. A further advantage includes significantly larger television display sizes. Thus, television displays of 30 to 50 inches diagonal measurement are practical in the practice of this invention. Large cathode ray tubes of this size range are difficult and expensive to manufacture. Likewise, such large size cathode ray tubes are bulky due to the required tube depth and present safety hazards due to the large envelope and internal vacuum. Thus, large 30 to 50 inches diagonal flat-panel television display have much greater volumetric efficiency than conventional large cathode ray tube television receivers thereby resulting in desirable space savings. The required system configurations of large television flat gas discharge displays are thin enough to mount the television directly to the wall of a room without need for large free standing cabinets.

FURTHER DISCUSSION OF DRAWINGS—FIGS. 9, 10, 11

Figure 9:
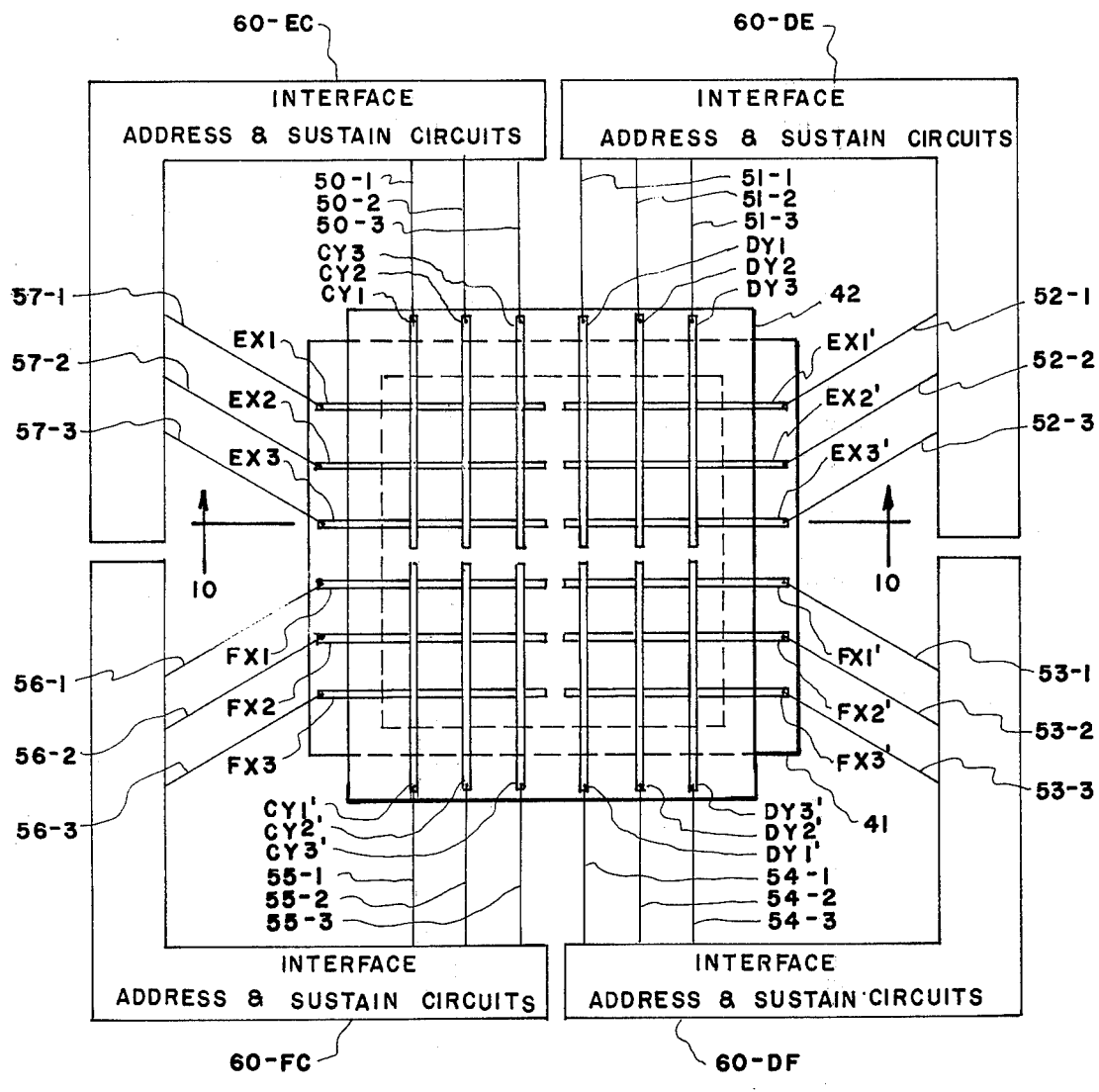

FIG. 9 shows an A.C. gas discharge (plasma) display, device with the display matrix of light emitting pixels divided into four (4) distinct areas, each area being driven by separate electronic interface circuits.

Figure 10:
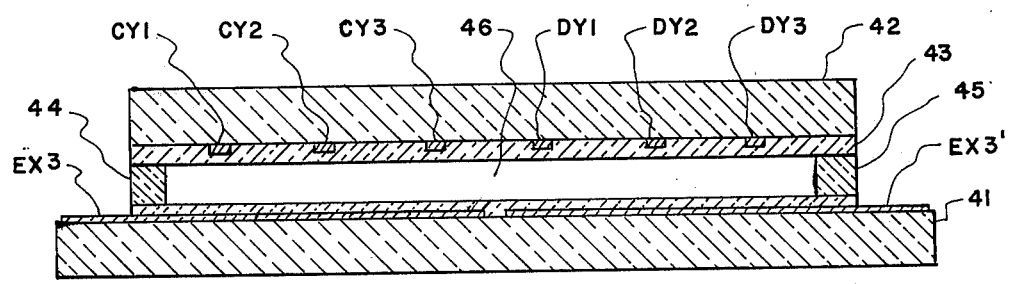

FIG. 10 is a cross-section of FIG. 9.

There is shown in FIGS. 9 and 10 transparent glass substrates 41, 42. Substrate 41 contains electrodes EX1, EX2, EX3, etc., EX1', EX2', EX3', etc., FX1, FX2, FX3, etc., and FX1', FX2', FX3', etc. Substrate 42 contains electrodes CY1, CY2, CY3, etc., CY1', CY2', CY3', etc., DY1, DY2, DY3, etc., and DY1', DY2', DY3', etc.

As illustrated in FIG. 9, the electrodes are physically and electrically separated in that the pixel matrix is divided into four separate and distinct areas.

The cross-overs of electrodes CY1, CY2, CY3, etc., and EX1, EX2, EX3, etc., form one separate display area of light emitting pixels energized by interface address and sustain circuits 60-FC through connectors 50-1, 50-2, 50-3, etc., and 57-1, 57-2, 57-3, etc.

The cross-overs of electrodes DY1, DY2, DY3, etc., and EX1', EX2', EX3', etc., form another separate display area of pixels energized by interface circuits 60-FE through connectors 51-1, 51-2, 51-3, etc., and 52-1, 52-2, 52-3, etc.

The cross-overs of electrodes FX1, FX2, FX3, etc., and CY1', CY2', CY3', etc. form another separate display area of pixels energized by interface circuits 60-FC through connectors 55-1, 55-2, 55-3, etc., and 56-1, 56-2, 56-3, etc.

The cross-overs of electrodes FX1', FX2', FX3', etc., and DY1', DY2', DY3', etc., form another display area of pixels energized by interface circuits 60-DF through connectors 53-1, 53-2, 53-3, etc., and 54-1, 54-2, 54-3, etc.

FIG. 10 shows in cross-section substrates 41, 42, bottom electrode halves EX3 and EX3', seal 45, dielectric layers 43, 44, top electrodes CY1, CY2, CY3, etc., and DY1, DY2, DY3, etc., and gaseous media 46.

The device embodiment of FIGS. 9 and 10 has been illustrated with drive electronics which may utilize state of the art sustain and address wave forms.

However, if the device of FIGS. 9 and 10 is to be used in a television or video mode, there can be used the trigger pulses and maintain signals illustrated in FIGS. 5 and 6 and electronic interface circuits similar to those illustrated in FIGS. 7 and 8.

Figure 11:
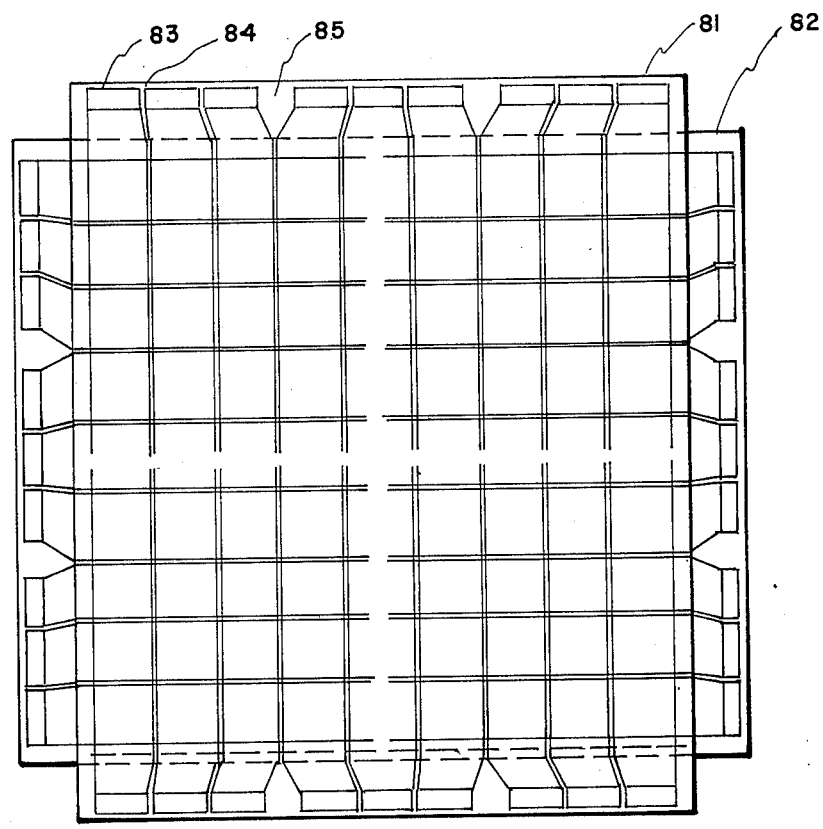

FIG. 11 illustrates one preferred electrode artwork arrangement to be used for large display panels. Specifically, there is shown substrates 81, 82, and electrode connector pads 83, each pad being the external connector for n electrodes where n is typically 32. The region or spacing 84 between two adjacent connector pads 83 is relatively small, typically 0.1 to 0.2 inch. The region or spacing 85 between two adjacent groups of connector pads is relatively large, typically 0.38 to 1.25 inches. The purpose and function of the spacing 85 is to provide a region for mounting and holding the heavy glass substrates 81, 82 within a frame or other structure to meet vibration and shock requirements, especially in a military invironment.

USES OF THIS INVENTION

The large area display devices of this invention, with low or high pixel resolution, are most suitable for many government and military applications including computer terminals, air traffic control, airborne command post, aircraft instrumentation, naval shipboard systems, intelligence information display, data recording systems, tactical computer systems, battery computer systems, army night vision systems, integrated fire support systems, telemetry integrated processing systems, radar or sonar systems, and satellite communications systems. Such applications and uses may be with or without television or video.

CONCLUSION

Although the best operation and fabrication modes, as contemplated for the practice of this invention, have been specifically illustrated and described in this disclosure, it is contemplated that various modifications in design may be made within the scope of this invention by persons skilled in the art.

I claim

1. In a large area A.C. gas discharge display device having an X—Y matrix of light emitting pixels defined by the cross-overs of transversely oriented arrays of electrodes, the improvement wherein at least one electrode array is divided into at least two distinct physical portions so as to provide lower electrical resistance per divided electrode line, lower electrical capacitance per discharge cell site along each divided electrode line, and lower electrical current per electrode line thereby reducing the electrical drive requirements of the panel interface drive circuits and providing more uniform electrical voltage pulses to each of the discharge cell sites along each electrode line.

2. The display device of claim 1 wherein both electrode arrays are divided, each into at least two distinct physical portions.

3. The display device of claim 1, wherein the device has a display area of at least 2500 square centimeters.

4. The display device of claim 1, wherein the electrodes in the divided arrays are at least 50 centimeters long.

5. The display device of claim 1 wherein the matrix is divided into 4 distinct physical portions wherein the electronic voltage pulses from different sources are applied to each distinct portion; the voltage from each source may be at the same or different level relative to the voltage from each of the other sources.

* * * * *